United States Patent
Rocquelay et al.

(10) Patent No.: US 10,270,684 B2
(45) Date of Patent: Apr. 23, 2019

(54) METHOD FOR CREATING A SUBFLOW OF DATA PACKETS

(71) Applicant: SAGEMCOM BROADBAND SAS, Rueil Malmaison (FR)

(72) Inventors: Antonie Rocquelay, Rueil Malmaison (FR); Massinissa Lalam, Rueil Malmaison (FR); Nicolas Vankieken, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 51 days.

(21) Appl. No.: 15/520,310

(22) PCT Filed: Oct. 15, 2015

(86) PCT No.: PCT/EP2015/073862
§ 371 (c)(1),
(2) Date: Apr. 19, 2017

(87) PCT Pub. No.: WO2016/062606
PCT Pub. Date: Apr. 28, 2016

(65) Prior Publication Data
US 2017/0317920 A1    Nov. 2, 2017

(30) Foreign Application Priority Data

Oct. 20, 2014 (FR) .................... 14 60060

(51) Int. Cl.
*H04L 12/707* (2013.01)
*H04L 29/06* (2006.01)
*H04L 12/741* (2013.01)

(52) U.S. Cl.
CPC .............. *H04L 45/24* (2013.01); *H04L 45/74* (2013.01); *H04L 69/14* (2013.01); *H04L 69/22* (2013.01); *Y02D 50/30* (2018.01)

(58) Field of Classification Search
None
See application file for complete search history.

(56) References Cited

U.S. PATENT DOCUMENTS

2012/0144062 A1* 6/2012 Livet ................ H04L 45/24
  709/239
2014/0351447 A1* 11/2014 Annamalaisami .........................
  H04L 65/1069
  709/227

FOREIGN PATENT DOCUMENTS

WO   2011/153415 A1   12/2011
WO   2013/061115 A1    5/2013

OTHER PUBLICATIONS

Jan. 25, 2016 Search Report issued in International Patent Application No. PCT/EP2015/073862.

* cited by examiner

*Primary Examiner* — Saba Tsegaye
(74) *Attorney, Agent, or Firm* — Oliff PLC; R. Brian Drozd

(57) ABSTRACT

A method for creating a supplementary subflow as a supplement to a subflow existing in a multipath network connection using a transport protocol suited to a multipath communication mode. The multipath network connection is implemented in a network comprising a source using said multipath network connection for communicating with a receiver via an intermediate network component. Following an opening of an intermediate communication path between the intermediate network component and the receiver, said intermediate network component implements the following steps: obtaining a packet intended for the source; creating a header representing a request to create said supplementary data packet subflow, the supplementary data packet subflow being intended to use the intermediate communication link; inserting said header in said packet; and transmitting said packet to the source so as to cause the initiation, by the source, of a procedure for creating said supplementary data packet subflow.

24 Claims, 18 Drawing Sheets

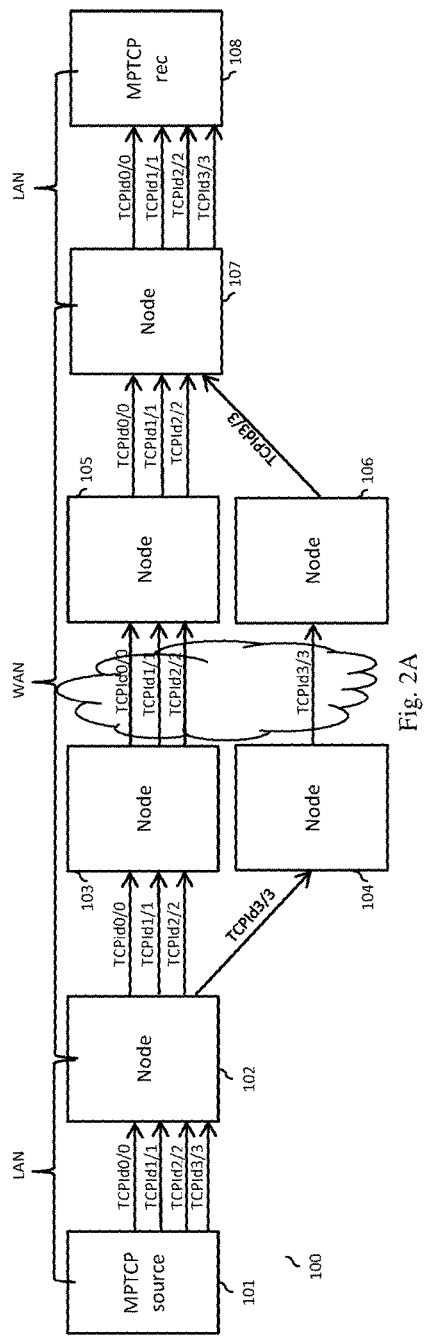
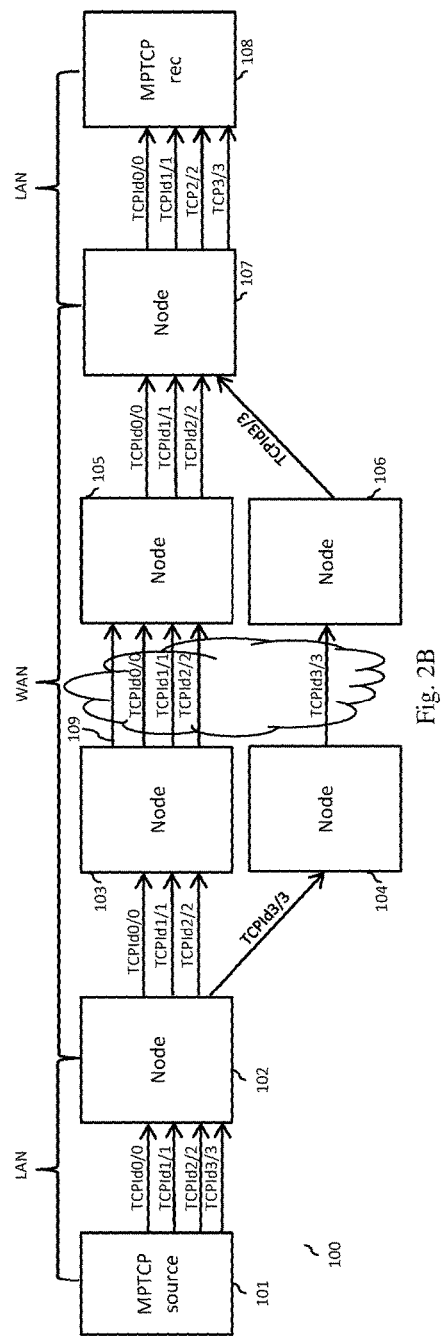
Fig. 2A
Fig. 2B

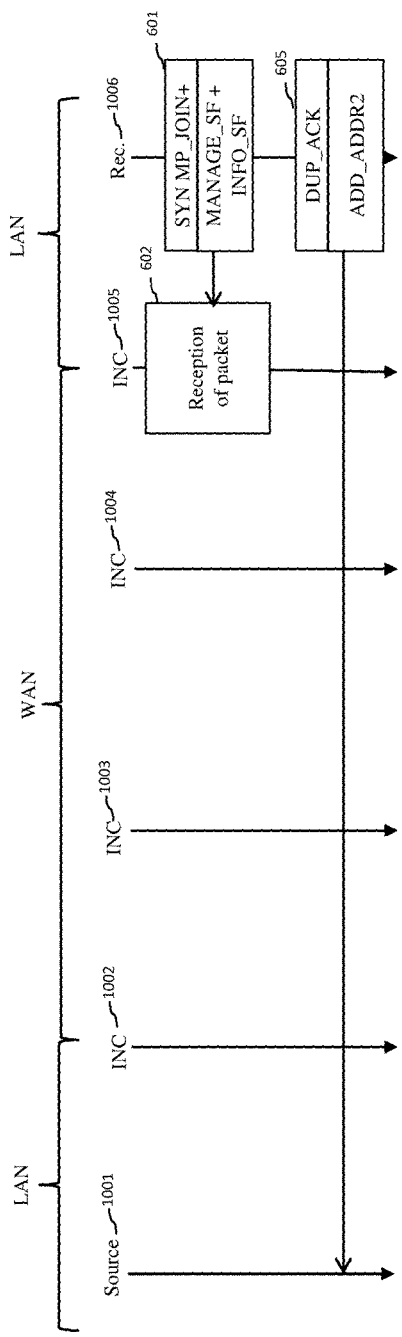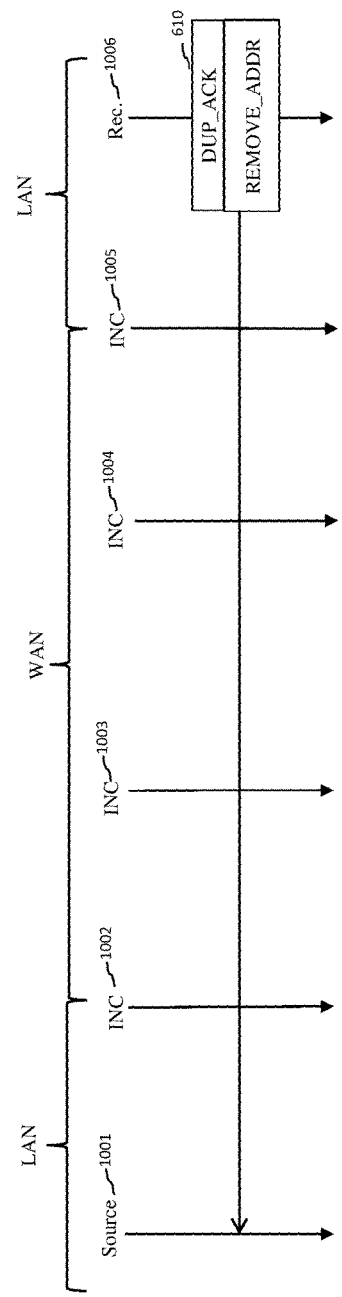
Fig. 6A
Fig. 6B

METHOD FOR CREATING A SUBFLOW OF DATA PACKETS

CROSS REFERENCE TO RELATED APPLICATIONS

This is a National Phase of PCT Application No. PCT/EP2015/073862 filed Oct. 15, 2015, which claims the benefit of French Patent Application No. 1460060 filed Oct. 20, 2014. The disclosure of the prior applications is hereby incorporated by reference herein in their entireties.

FIELD

The present invention relates to a method and device for creating a subflow of supplementary data packets as a supplement of an existing subflow of data packets in a network connection using a transport protocol suited to a multipath communication mode.

BACKGROUND

These last decades have seen a rapid increase in applications on communication networks, first of all on cable networks and then, more recently, on wireless networks. Very rapidly, needs for making communications reliable have made themselves felt. At the beginning of the nineties, a transmission protocol was proposed to ensure reliability of transmissions. This protocol, referred to as TCP (RFC-793, Transport Control Protocol), proposes several reliability mechanisms. Among these reliability mechanisms, there are a congestion control mechanism for providing equitable sharing of bandwidth between various applications using the same communication network and an error control mechanism ensuring a reliable transport of each data item transmitted. The data being transmitted in the form of an ordered series of packets, an out-of-order reception of the transmitted data is identified as a transmission error by the error control mechanism, each transmission error causing a reaction of the congestion control mechanism resulting in general in a reduction in the data transmission rate. The TCP protocol spread widely on networks to the point that this protocol is now considered to be essential for ensuring global stability of communication networks.

In defining the TCP protocol, applications existing at the time of its creation were considered. The TCP protocol has not therefore taken into account a recent appearance of communication applications on mobile appliances, nor the fact that the same appliance can communicate simultaneously on several communication paths such as cable links (Ethernet, IEEE1394) and/or wireless links (Wi-Fi, 3G, 4G, Bluetooth) in accordance with a multipath communication mode, each path being associated with an IP address (RFC 791: Internet Protocol) that is particular to it. The reliability of mechanisms of the TCP protocol are not suited to the multipath communication mode, since this communication mode on a plurality of paths may cause out-of-order receptions of packets that would be wrongly interpreted as transmission errors by the TCP reliability mechanisms.

Recently, a new protocol enabling communication appliances to benefit from a multipath communication mode was specified. This protocol, referred to as MPTCP (RFC-6824, Multipath TCP) can be seen as a development of the TCP protocol. In defining the MPTCP protocol, account was taken of two major requirements: compatibility with applications and compatibility with the network.

Compatibility of applications means that applications functioning with the TCP protocol must be able to function with the MPTCP protocol without modification.

Compatibility vis-à-vis the network means that the MPTCP protocol must be able to function on any network path on which TCP functions. Many network paths comprise intermediate network components (INCs) ("middleboxes") such as network address translators (NATs), firewalls, proxies, gateways, etc. The INCs may be positioned in a local network of the LAN (Local Area Network) type or in an extended network of the WAN (Wide Area Network) type. Unlike routers, when TCP traffic passes through an INC the INC is capable of recognising the TCP traffic. This knowledge enables the INC to apply particular processing operations to the TCP traffic, such as accelerated processing or transfer mechanisms used in general by hardware accelerators. The MPTCP protocol must be able to benefit from the same accelerated processing or transfer mechanisms as the TCP protocol.

The MPTCP protocol is subject to certain limitations. For example, one characteristic of the MPTCP protocol is that it requires that a first network unit, which we shall refer to the "source" hereinafter, and a second network unit, which we shall refer to as the "receiver" hereinafter, the source and receiver being associated with the same connection, both support the MPTCP protocol. Such a restriction could limit the use of the MPTCP protocol, for example when a source implementing the MPTCP protocol wishes to communicate with a receiver not knowing the MPTCP protocol but for example only the TCP protocol.

Moreover, the MPTCP protocol is particularly suited when the network connecting a source and a receiver consists of a plurality of paths parallel from end to end. The MPTCP protocol is less effective when a portion of the network connecting the source and the receiver consists of a single path.

Various solutions have been proposed for overcoming the above restrictions. For example, when at least one portion of the network connecting a source and a receiver compatible with the MPTCP protocol consists of a single path, a first solution consists of encapsulating TCP subflows of a MPTCP connection, which we refer to as an "MPTCP subflow" hereinafter, in a single flow on the portion of the network consisting of a single path. The single flow is then managed by a single-path transport protocol, such as TCP, the MPTCP subflows encapsulated in the single flow being considered to be data of the single flow. This first solution is in general considered to be expensive in computing terms, but also in terms of memory use. This is because it requires firstly encapsulating each packet of each MPTCP subflow and secondly storing each packet of all the encapsulated MPTCP subflows as long as an error check mechanism of the encapsulation protocol has not checked that the packets have indeed been received. In addition, a loss of a packet in the single flow in general causes a global reaction of the congestion control mechanism of the encapsulation protocol and therefore a reduction in transmission rate in all the encapsulated MPTCP subflows, whereas the packet loss might affect only one MPTCP subflow among the encapsulated MPTCP subflows. Moreover, this solution requires the introduction into the network of at least one network unit able to make encapsulations. It may be added that, during an encapsulation, the network units able to make encapsulations do not use accelerated processing and transfer mechanisms like conventional INCs.

A second solution allows avoiding the incompatibility of a source or receiver with the MPTCP protocol. This second solution consists of inserting in a network an intermediate network unit, such as an INC, capable of providing a relay between a multipath connection such as for example an MPTCP connection and at least one single-path connection such as for example a TCP or UDP connection. The INCs capable of providing a relay between an MPTCP connection and at least one TCP connection are known by the term "TCP/MPTCP relay". A TCP/MPTCP relay is able to match a TCP flow of a TCP connection, which we refer to hereinafter simply as "TCP flow", with an MPTCP flow. A TCP/MPTCP relay thus enables a source (or respectively a receiver) using the MPTCP protocol (which we shall refer to hereinafter as "MPTCP source (or respectively receiver)") to communicate with a receiver (or respectively a source) using the TCP protocol (which we shall refer to hereinafter as "TCP receiver (or respectively source)"). When a TCP/MPTCP relay receives a packet of an MPTCP subflow (which we shall refer to hereinafter as "MPTCP packet") coming from an MPTCP source, the relay extracts the data contained in the MPTCP packet, inserts them in a packet of a TCP stream (which we shall refer to hereinafter as "TCP packet"), and transmits the TCP packet in the direction of the TCP receiver in the TCP flow. When a TCP/MPTCP relay receives a TCP packet coming from a TCP source, the relay extracts the data contained in the TCP packet, inserts these data in the MPTCP packet and transmits the MPTCP packet in the direction of the MPTCP receiver in an MPTCP subflow.

The major drawback of this solution is requiring the installation of TCP/MPTCP relays in the networks. In addition, these relays do not use processing and transfer accelerations like conventional INCs.

Use of the MPTCP protocol comprises three main phases:
a phase of establishing a connection,
a phase of transferring data packets in the context of the connection established, and
a phase of dropping the connection.

The establishment of an MPTCP connection begins with a procedure known as "three-way handshake" comprising the following steps implemented sequentially:
the sending of a source synchronisation packet, referred to as "SYN packet", by a source in the direction of a receiver,
the sending of a receiver synchronisation packet referred to as "SYN/ACK packet", by the receiver in the direction of the source, this packet also providing acknowledgement of the source synchronisation packet, i.e. the SYN packet, and
the sending of a packet acknowledging the destination synchronisation packet (i.e. the SYN/ACK packet), referred to as "ACK packet", by the source in the direction of the receiver.

The connection is established when the receiver receives the ACK packet. Each packet transmitted in the context of an MPTCP connection is transmitted in an MPTCP subflow. An MPTCP subflow is identified by a quintuplet per connection direction defined during the connection establishment phase. In the direction source to receiver (or respectively receiver to source), this quintuplet comprises a source IP address and a receiver IP address, a source port number, a receiver port number and an identifier of the receiver IP address (or respectively an identifier of the source address). Hereinafter, for simplification, we shall consider that an MPTCP subflow is identified by a sextuplet comprising the source IP address, the receiver IP address, the source port number, the receiver port number, the identifier of the receiver IP address and the identifier of the source IP address. It should be noted that the identifier of the source IP address and the identifier of the receiver IP address enable the source and receiver to find the values of source and receiver IP addresses when network address translators NATs are present in the network.

The data packet transfer phase uses the IP addresses and the port numbers defined during the connection establishment phase. This phase benefits fully from acceleration mechanisms in the INCs.

During the phase of dropping a connection, the connection is dropped either abruptly by exchange of a packet of the "reset" type, referred to as an "RST" packet, or more evenly, by exchange of a packet of the "FIN" type, hereinafter referred to as "FIN packet", between the source and the receiver.

Whereas a connection according to the TCP protocol can be associated with only one data flow, a connection according to the MPTCP protocol may comprise a plurality of MPTCP subflows. A data transfer application using an MPTCP connection can then at any time use any of the MPTCP subflows.

An MPTCP connection comprising a plurality of MPTCP subflows is established in a plurality of steps comprising a creation of an initial subflow and then a creation of at least one additional subflow.

FIG. 1 shows schematically an example of use of the MPTCP protocol during the creation of an MPTCP connection comprising an initial MPTCP subflow and an additional MPTCP subflow. This embodiment takes place in a network comprising four INCs 1002 to 1005, and a first network unit 1001 and a second network unit 1006 compatible with the MPTCP protocol. The network units 1001 and 1006 can alternately fulfil a role of source or receiver. Hereinafter we focus on the case where the network unit 1001 fulfils a role of source and where the network unit 1006 fulfils a role of receiver (in some embodiments). All the methods described hereinafter are however reversible (in other embodiments) and suited to the case where the network unit 1001 fulfils the role of a receiver and the network unit 1006 fulfils the role of a source. The network unit 1001 is then referred to as the source 1001, and the network unit 1006 the source 1006. The source 1001 is situated in a LAN, referred to as "source LAN", comprising the source 1001 and the INC 1002. The receiver 1006 is situated in a LAN, referred to as a "receiver LAN", comprising the receiver 1006 and the INC 1005. The two LANS are connected to a WAN comprising the INCs 1003 and 1004. The initial MPTCP subflow is created during a phase of establishing an MPTCP connection. A creation of the initial MPTCP subflow uses a three-way handshake 110, 111 and 112 in which the SYN, SYN/ACK and ACK packets comprise a header of the MP_CAPABLE type. From the point of view of the MPTCP protocol, the header MP_CAPABLE must absolutely be situated in the SYN, SYN/ACK and ACK packets when the initial MPTCP subflow is created. However, a TCP receiver that receives a packet containing the MP_CAPABLE header would not be able to interpret the MP_CAPABLE header and would ignore this header. An exchange of packets containing the MP_CAPABLE header allows firstly to ensure that the source and receiver can implement the MPTCP protocol and secondly to create the initial subflow.

The additional subflow is created following the creation of the initial subflow by implementing a three-way handshake procedure 120, 121 and 122 in which the SYN, SYN/ACK and ACK packets comprise a header of the MP_JOIN type. From the point of view of the MPTCP protocol, the MP_JOIN header must absolutely be in the SYN/ACK and ACK packets when the additional subflow is created. However, a TCP receiver receiving a packet containing the MP_JOIN header would not be able to interpret the MP_JOIN header and would ignore this header.

The example embodiment in FIG. 1 describes the creation of a single additional MPTCP subflow. Other additional MPTCP subflows may be created, according to the number of IP addresses available on the source and on the receiver.

The creation of additional MPTCP subflows may be dynamic according to the availability of transmission paths that can be used for the MPTCP connection.

Each MPTCP subflow is associated with a sextuplet that is particular to it.

The TCP error check and congestion control mechanisms have been adapted in order to take into account the specificities of the multipath context.

As seen above, the MPTCP protocol is suited to the dynamic management of the opening up of new communication paths or the closure of existing communication paths. However, it is necessary for these paths to be end-to-end, that is to say from the source to the receiver. FIG. 2A shows schematically an example of a communication network 100 in which communications between a source 101 and a receiver 108 are managed by the MPTCP protocol. The communication network 100 comprises six nodes of the INC type numbered 102 to 107, a source 101 compatible with the MPTCP protocol and a receiver 108 compatible with the MPTCP protocol. The source 101 and the node 102 belong to a first LAN, referred to as the source LAN. The receiver 108 and the node 107 belong to a second LAN, referred to as the receiving LAN. The nodes 103 to 106 belong to a WAN. The source 101 is capable of communicating over four different paths with the receiver 108 using an MPTCP connection. An initial MPTCP subflow, denoted TCPId0/0, uses a first path, and three additional MPTCP subflows, denoted TCPId1/1, TCPId2/2 and TCPId3/3 use the remaining three paths. In the notation TCPIdi/j, the suffix i/j indicates that the MPTCP subflow uses a source address identifier (address ID) i and a receiver address identifier j.

The transport protocols suited to a multipath communication mode, such as for example the MPTCP protocol, cannot manage an opening of new intermediate communication paths in a network, an intermediate communication path being defined as a path between an INC and a receiver or between two INCs.

FIG. 2B repeats the communication network 100 described in relation to FIG. 2A and illustrates certain limitations to the MPTCP protocol as currently defined. In FIG. 2B, a new intermediate path 109 of the WAN type opens during an MPTCP connection. The MPTCP protocol does not allow to detect an opening of an intermediate path during a MPTCP connection and even more so does not allow to use this new path. Consequently opening the intermediate path 109, which could potentially enable the source 101 to communicate with the receiver 108 at a higher rate, in reality has no beneficial effect.

SUMMARY

The problem addressed by the present invention consists of enabling an application implementing a connection using a transport protocol suited to a multipath communication mode to use one or more intermediate paths that have appeared during connection.

To this end, according to a first aspect, the present invention relates to a method for creating a supplementary data packet subflow as a supplement of an existing data packet subflow in a network connection, referred to as a multipath network connection, using a transport protocol suited to a multipath communication mode, the multipath network connection being implemented in a communication network comprising a plurality of network units, a first network unit in said plurality using a connection set comprising said multipath network connection for communicating with a second network unit in said plurality via a third network unit in said plurality, referred to as an intermediate network component. Following an opening of an intermediate communication path from the intermediate network component and in the direction of the second network unit, said intermediate network component implements the following steps: obtaining a packet intended for the first or second network unit and compatible with said transport protocol; creating a header of a first type, the header of the first type representing a request to create said supplementary data packet subflow, the supplementary data packet subflow being intended to use the intermediate communication path in a data packet transfer phase following the creation of the supplementary data packet subflow; inserting said header of the first type in said packet; transmitting said packet in the direction of said destination so as to cause the initiation, by the first or second network unit, of a procedure for creating said supplementary data packet subflow in the context of said multipath network connection.

According to one embodiment, for each subflow created in the context of said multipath network connection, the intermediate network component applies an accelerated-processing procedure to each packet transmitted during data packet transfer phases using at least one of said created subflows, and in that the intermediate network component interrupts the accelerated-processing procedure for at least one of the created subflows in order to allow obtaining said packet in which the header of the first type is to be inserted and to transmit said packet in which the header of the first type has been inserted.

According to one embodiment, the procedure for creating the supplementary data packet subflow comprises a three-way handshake procedure implemented between two network units in said plurality comprising: a first step of creating and transmitting a first synchronisation packet in the direction of the second network unit via the intermediate network component; a second step of creating and transmitting a second synchronisation packet in the direction of the first network unit and via the intermediate network component; a second step of creating and transmitting a second synchronisation packet in the direction of the first network unit and via the intermediate network component, the second synchronisation packet being able to acknowledge receipt of the first synchronisation packet; a third step of creating and transmitting a receipt-acknowledgement packet in the direction of the second network unit via the intermediate network; at least one packet exchanged during the three-way handshake procedure comprises a header of a second type comprising information causing the use of said intermediate communication path during the data packet transfer phase.

According to one embodiment, the header of the second type of the first synchronisation packet is created and inserted by the first network unit in said first synchronisation packet.

According to one embodiment, the header of the second type of the first synchronisation packet is created and inserted by the intermediate network component in said first synchronisation packet.

According to one embodiment, the header of the second type of the second synchronisation packet is deleted from said second synchronisation packet by the intermediate network component before being transmitted to the first network unit.

According to one embodiment, the header of the second type of the receipt-acknowledgement packet is created and inserted in the receipt-acknowledgement packet by the intermediate network component.

According to one embodiment, when the header of the first type is created, the intermediate network component determines a random sequence number and inserts said random sequence number in the header of the first type, said random sequence number being used by the intermediate network component to identify packets exchanged between the source and the receiver via the intermediate network component in the context of the three-way handshake procedure.

According to one embodiment, when the first synchronisation package is created, the random sequence number value determined by the intermediate network component is copied into a first field of the header of the second type, so that, when the intermediate network component subsequently receives a first synchronisation packet comprising a first field the value of which is equal to the value of said random sequence number, the intermediate network component determines that said first synchronisation packet relates to the procedure for creating the supplementary data packet subflow and deduces from this that the first synchronisation packet must be transmitted using the intermediate communication path.

According to one embodiment, when the first synchronisation packet is created, a subflow identifier defined by the first network unit is attributed to the supplementary subflow and is inserted in a second field of the header of the second type, and in that, on reception, by the intermediate network component, of the first synchronisation packet comprising the first field the value of which is equal to the value of said random sequence number, the intermediate network component associates the subflow identifier, defined by the first network unit, inserted in the second field of the header of the second type, with the intermediate path so that each packet transmitted by the first network unit during the data packet transfer phase uses the intermediate communication path.

According to one embodiment, when the first synchronisation packet is created, the intermediate subflow is associated with an address of the first network, the address having been used by the existing data packet subflow, and an identifier of the address of the first network unit is inserted in a third field of the header of the second type, and in that, when the first synchronisation packet is received by the intermediate network component, the intermediate network component associates the identifier of the address of the first network unit with the subflow identifier.

According to one embodiment, when the header of the first type is created, the intermediate network component determines a first port number in a first set of port numbers associated with a communication path belonging to a transmission path used to transmit said packet in which the header of the first type is inserted and inserts information representing the first port number in the header of the first type, the information representing said first port number being used by the intermediate network component to identify packets exchanged between the source and the receiver via the intermediate network component in the context of the three-way handshake procedure.

According to one embodiment, said destination is the first network unit or the second network unit and in that, when the destination is the second network unit, the second network unit implements the following steps: creating a header of a third type, the header of the third type comprising information representing the first port number; obtaining a packet intended for the first network unit; inserting said header of the first type in said packet obtained; and transmitting said packet in the direction of the first network unit so that the first network unit communicates with the intermediate network component using a destination port corresponding to the first port number.

According to one embodiment, the first synchronisation packet is sent to a port of the intermediate network component corresponding to the first port number, reception of the first synchronisation packet on said port of the intermediate network component corresponding to the first port number enabling the intermediate network component to determine that said first synchronisation packet relates to the procedure for creating the supplementary data packet subflow and deduces from this that the first synchronisation packet must be transmitted using the intermediate communication path.

According to one embodiment, when the header of the second type inserted in the first synchronisation packet is created, the intermediate network component inserts in said header of the second type information representing a first set of local port numbers dependent on the first port number, each network unit in said plurality, through which the first synchronisation packet passes, defines a second set of local port numbers included in the set of port numbers represented by the information representing a set of local port numbers received in said header of the second type, and replaces said information representing a set of local port numbers contained in said header of the second type with information representing the second set of local port numbers.

According to one embodiment, the receipt-acknowledgement packet is sent to a port of the intermediate network component corresponding to the first port number, receipt of the receipt-acknowledgement packet on said port of the intermediate network component corresponding to the first port number enabling the intermediate component to determine that said receipt-acknowledgement packet relates to the procedure for creating the supplementary data packet subflow and deduces from this that the receipt-acknowledgement packet must be transmitted using the intermediate communication path.

According to one embodiment, to close the supplementary subflow, the intermediate network component performs the following steps: obtaining a data packet the destination of which is the first or second network unit and compatible with the transmission protocol; creating a header of a fourth type, the header of the fourth type representing a request to close the supplementary data subflow, inserting said header of the fourth type in said packet; transmitting said packet in the direction of the destination so as to cause the initiation, by the first or second network unit, of a procedure to close the supplementary data subflow.

According to one embodiment, when the header of the fourth type is created, a plurality of items of information are inserted in the header of the fourth type, the plurality of items of information comprising an identifier of an address associated with the supplementary data packet subflow, an identifier of the subflow associated with the supplementary data subflow, and a value indicating which network unit must initiate the procedure for closing the supplementary data packet subflow, this plurality of items of information being used so as to close the supplementary subflow at the first and second network units.

According to one embodiment, when the header of the fourth type is created, a plurality of items of information are inserted in the header of the fourth type, the plurality of items of information comprising an identifier of an address associated with the supplementary data packet subflow, information representing the first port number and a value indicating which network unit must initiate the procedure for closing the supplementary data packet subflow, this plurality of items of information being used so as to close the supplementary subflow at the first and second network units.

According to one embodiment, the set of connections comprises a single-path connection, and in that the intermediate network component relays a subflow of a multipath connection in a flow of a single-path connection or encapsulates a subflow of a multipath connection in a flow of a single-path connection, the first and third steps of the three-way handshake procedure and/or the second step of the three-way handshake procedure being implemented by an intermediate network component.

According to a second aspect of the present invention, the present invention relates to a device of the intermediate network component type able to create a supplementary data packet subflow as a supplement to an existing data packet subflow in a network connection, referred to as a multipath network connection, using a transport protocol suited to a multipath communication mode, the multipath network connection being used in a communication network comprising a plurality of network units, a first network unit in said plurality using a set of connections comprising said multipath network connection to communicate with a second network unit in said plurality via said device. Said device comprises the following means used following the opening of an intermediate communication path from said device and in the direction of the second network unit: means for obtaining a packet destined for the first or second network unit and compatible with said transport protocol; means for creating a header of a first type, the header of the first type representing a request to create said supplementary data packet subflow, the supplementary data packet subflow being intended to use the intermediate communication path in a data packet transfer phase following the creation of the supplementary data packet subflow; means for inserting said header of the first type in said packet; means for transmitting said packet in the direction of the destination of the packet so as to cause the initiation, by the first or second network unit, of a procedure of creating said supplementary data packet subflow in the context of said multipath network connection.

According to a third aspect of the present invention, the present invention relates to a communication system comprising at least one device of the intermediate network component type according to the second aspect and a plurality of network units comprising first and second network units able to communicate using a set of connections comprising a connection, referred to as a multipath network connection, using a transport protocol suited to a multipath communication mode, the first network unit comprising the following means, used following the opening of an intermediate communication path from said device of the intermediate network component type and in the direction of the second network unit: means for creating and transmitting a first synchronisation packet in the direction of the second network unit via said device of the intermediate network component type; means for creating and transmitting a receipt-acknowledgement packet in the direction of the second network unit via said device of the intermediate network component type in response to a second synchronisation packet coming from the second network unit; the second network unit comprising the following means, used following the opening of said intermediate communication path: means for creating and transmitting a second synchronisation packet in the direction of the first network unit and via said device of the intermediate network component type, the second synchronisation packet being able to acknowledge receipt of the first synchronisation packet; at least one packet comprising a header of a second type comprising information causing the use of said intermediate communication path during a data packet transfer phase in the context of the supplementary data packet subflow.

According to a fourth aspect of the present invention, the invention relates to a computer program product containing instructions for the implementation, by a device, of the method according to the first aspect by a processor of the device.

According to a fifth aspect of the present invention, the present invention relates to storage means storing a computer program containing instructions for the implementation, by a device, of the method according to the first aspect when said program is executed by a processor of the device.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIG. 2A shows schematically a communication network in which communications between a source and a destination are managed by the MPTCP protocol, FIG. 2B illustrates certain limitations to the MPTCP protocol as currently defined, FIG. 6A depicts schematically a procedure implemented in the context of the invention when an INC of the address translator type (NAT) prevents the creation of a supplementary MPTCP subflow, FIG. 6B shows schematically an example of implementation of a procedure for deleting a set of MPTCP subflows linked to the same IP address of a receiver;

DETAILED DESCRIPTION

The present invention is explained taking the example of an application using the MPTCP protocol. The principles of the invention are however adaptable to any other transport protocol suited to a multipath communication mode. The present invention is situated in the field of communications on a network.

One method according to the invention, among other things, enables the INCs to analyse the subflows of the MPTCP connections to allow the addition or removal of new MPTCP subflows in the case of the opening of intermediate paths in a communication network, such as for example the opening of paths in a WAN. To do this, an INC according to the invention has the capability of analysing the signalling of the MPTCP connections, inserting, in MPTCP packets passing through the INC, headers for implementing the invention, or creating and sending packets for transmitting information enabling the invention to be implemented. The method according to the invention is referred to hereinafter as the MPTCP+ method.

Figure 3:
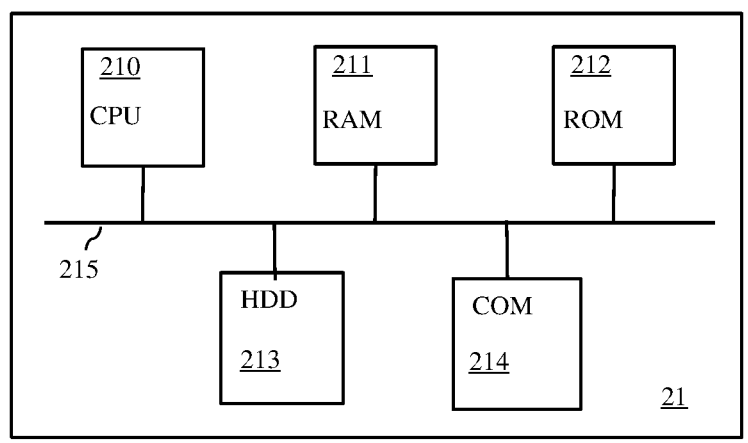
FIG. 3 depicts schematically a device able to implement the present invention in a source, a receiver or an intermediate network component (INC)

FIG. 3 illustrates schematically an example of hardware architecture of a device 21 able to implement the invention either in a source such as the source 1001 or in a receiver such as the receiver 1006 or in an INC such as the INCs 1002 to 1005. The device 21 comprises, connected by a communication bus 215: a processor or CPU (central processing unit) 210; a random access memory RAM 211; a read only memory ROM 212; a storage unit 213 or a storage medium reader, such as an SD (secure digital) card reader or USB (universal serial bus) key reader or a hard disk HDD (hard disk drive); at least one communication interface 214 for exchanging data with other equipment. The communication interface 214 enables the device 21 to receive data packets, to transmit data packets and, in the case of a source or a receiver, to receive instructions from a user by means for example of a control device (not shown) such as a pointing device, enabling the user to manipulate a graphical interface on a display device (not shown).

The processor 210 is capable of executing instructions loaded into the RAM 211 from the ROM 212, from an external memory (not shown), from a storage medium, or from a communication network. When the device 21 is powered up, the processor 210 is capable of reading instructions from the RAM 211 and executing them. These instructions form a computer program causing the implementation, by the processor 210, of all or some of the algorithms and steps described hereinafter.

In a particular embodiment of the device 21, the device 21 comprises a device for the accelerated processing of data packets (not shown). The device for the accelerated processing of data packets is connected to the communication bus 215. The device for the accelerated processing of data packets is able to receive and transmit data packets very quickly by means of the interface 214 without these data packets having to be processed by the processor 210. The processor 210 can activate or deactivate the device for the accelerated processing of data packets when necessary and in particular, as will be seen hereinafter in relation to FIG. 5, when a new intermediate path is detected by an INC. When the data packet processing device is deactivated, each data packet received by the device 21 is processed by the processor 210, in accordance with a decreased-speed processing mode.

All or some of the algorithms and steps described hereinafter can thus be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

Implementation of the MPTCP+ method is particularly simplified when all the elements of a network (source, INC, receiver) are compatible with the MPTCP+ method. This case is described in relation to FIGS. 4, 5 and 6. However, this condition is not necessary, and the incompatibility of some elements of the network with the MPTCP+ method does not prevent an implementation of the MPTCP+ method.

Thus it is not necessary for each INC between a source and a receiver to be compatible with the MPTCP+ method. It suffices for at least two elements of the network (source, INC, receiver) to be compatible with the MPTCP method, and for at least one INC to support the MPTCP+ method. Ideally, any network element situated between said two network elements compatible with the MPTCP method and having a plurality of input/output interfaces should support the MPTCP+ method in order to guarantee unicity of a route for requests to create additional subflows. If such is not the case, the existence of a time delay when there is a request for the creation of an additional subflow by an INC (and detailed hereinafter) nevertheless allows to apply the invention.

The use of the MPTCP+ method with a source compatible with the MPTCP protocol but incompatible with the MPTCP+ method is possible. This is because an INC compatible with the MPTCP+ method is able to compensate for any incompatibility of the source with the MPTCP+ method by inserting, in MPTCP data packets generated by the source, headers compatible with the MPTCP+ method. This case is described hereinafter in relation to FIGS. 9, 10 and 11.

The use of the MPTCP+ method with a source incompatible with the MPTCP protocol and the MPTCP+ method is possible. It is however necessary in this case to associate with the source a TCP/MPTCP relay compatible with the MPTCP+ method or an MPTCP encapsulation device compatible with the MPTCP+ method. This case is described hereinafter in relation to FIGS. 12A, 12B and 13.

The same applies with a receiver. The use of the MPTCP+ method with a receiver compatible with the MPTCP protocol but incompatible with the MPTCP+ method is possible. This is because an INC compatible with the MPTCP+ method is able to compensate for any incompatibility of the receiver with the MPTCP+ method by deleting, from data packets compatible with the MPTCP+ method, the headers compatible with the MPTCP+ method. This case is described in relation to FIGS. 9, 10 and 11.

The use of the MPTCP+ method with a receiver incompatible with the MPTCP protocol and the MPTCP+ method is possible. It is however necessary in this case to associate with the receiver a TCP/MPTCP relay compatible with the MPTCP+ method or an MPTCP encapsulation device compatible with the MPTCP+ method. This case is described hereinafter in relation to FIGS. 7A, 7B and 8.

Figure 1:
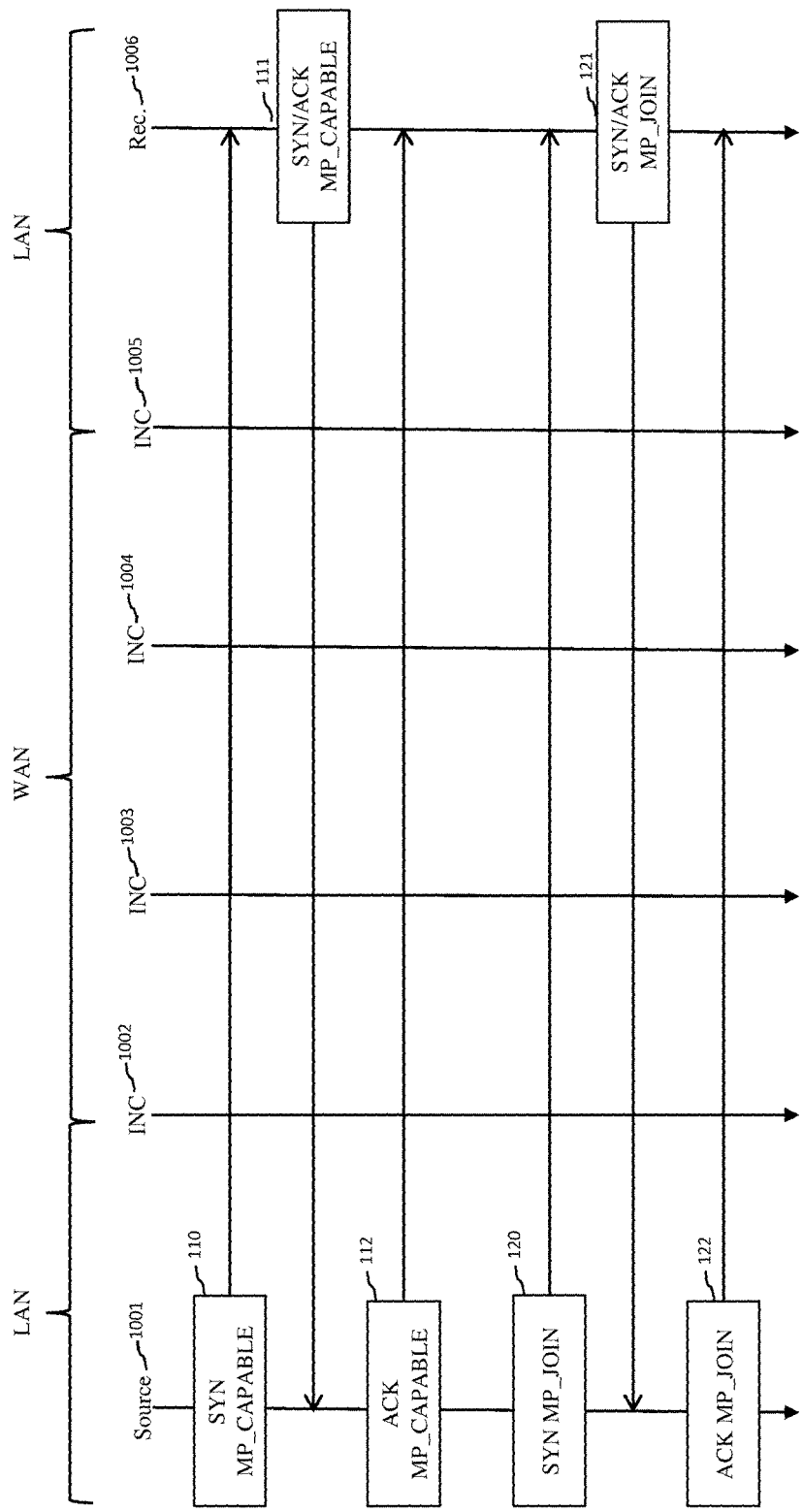
FIG. 1 shows schematically an example of implementation of the MPTCP protocol when an MPTCP connection comprising an initial subflow and an additional subflow is created.
Figure 4:
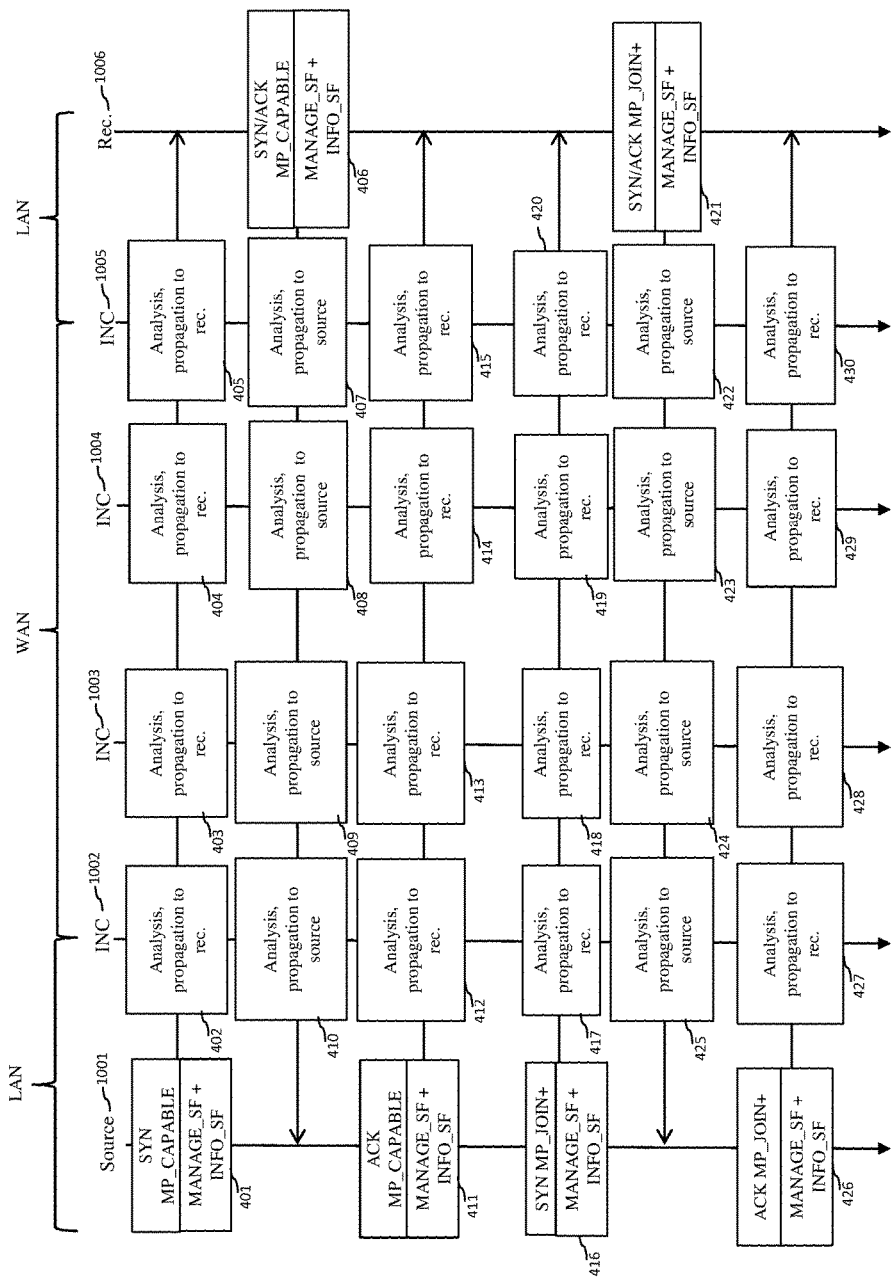
FIG. 4 illustrates schematically an example of implementation of a method according to the invention for creating an MPTCP subflow in a network, the MPTCP subflows comprising an initial MPTCP subflow and an additional MPTCP subflow.

FIG. 4 illustrates schematically an example of implementation of a method according to the invention for creating subflows of an MPTCP connection in the network described in relation to FIG. 1, the subflows comprising an initial subflow and an additional subflow, these two creations being initiated by the source 1001. The source 1001, the receiver 1006 and the INCs 1002 to 1005 are compatible with the MPTCP protocol and the MPTCP+ method. The two creations of MPTCP subflows take place in the context of the MPTCP+ method.

In a first phase described in relation to steps 401 to 415, an MPTCP subflow, identified by a first sextuplet, is created on a first path. The two address identifiers will for example take the value "0". This first phase begins in a step 401 with the creation and sending of an SYN packet with a conventional header MP_CAPABLE as described in relation to FIG. 1 and a header MANAGE_SUBFLOW comprising a subheader INFO_SUBFLOW. The header MANAGE_SUBFLOW is a header that can be inserted in an MPTCP packet and allows to identify the use of the MPTCP+ method. This header may be composed of a plurality of subheaders.

Figure 14A:
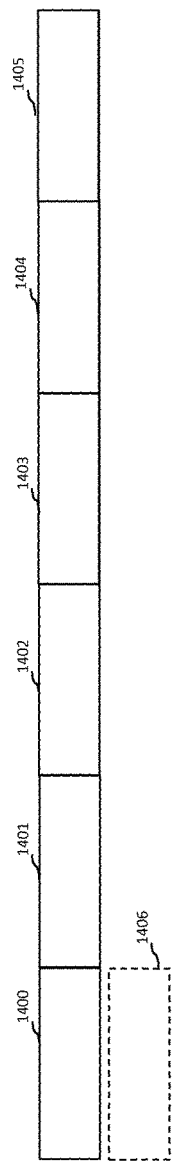
FIG. 14A shows schematically an SYN packet header of the MANAGE_SUBFLOW type comprising a header of the INFO_SUBFLOW type according to a first embodiment of the invention.

FIG. 14A describes a SYN packet header of the MANAGE_SUBFLOW type comprising the subheader INFO_SUBFLOW created by a source. To simplify, a header MANAGE_SUBFLOW comprising a subheader INFO_SUBFLOW will be referred to hereinafter as "header INFO_SUBFLOW". The fields 1400, 1401 and 1402 of a conventional MPTCP header referred to respectively as Kind, Length and SubType in accordance with the terminology used in the MPTCP protocol are found in the header INFO_SUBFLOW. The field SubType 1402 takes a specific value allowing to identify the header MANAGE_SUBFLOW, for example the value 0×09 in hexadecimal. The header INFO_SUBFLOW allows to exchange information between the source 1001, the receiver 1006 and the INCs 1002 to 1005 during the phase of creation of an MPTCP connection using the MPTCP+ method. The header INFO_SUBFLOW comprises a field 1403, referred to as SubSubT in accordance with the terminology used in the MPTCP protocol, coded for example in four bits taking a specific value allowing to identify the header INFO_SUBFLOW, e.g. the value 0×00 in hexadecimal. The field SubSubT 1403 is followed by a field 1404, referred to Sf_Id, allowing to identify an MPTCP subflow and a field 1405, referred to as Addr_Id, allowing to identify an IP address of a source at the origin of the subflow. In the case of the header MANAGE_SUBFLOW, the fields Sf_Id 1404 and Addr_Id 1405 are fixed-size fields coded for example in four bits. Optionally the header INFO_SUBFLOW may contain a field 1406, referred to as Seq_Req, coded for example in 15 bits, allowing to identify a sequence number of a request to create an MPTCP flow, when this request has been sent by an INC. In the example in FIG. 4, the request is sent by the source 1001. The field Seq_Req 1406 is therefore absent from the SYN packet.

In step 401, the fields Sf_Id 1404 and Addr_Id 1405 of the header INFO_SUBFLOW are set to "0".

During a step 402, the INC 1002 receives the SYN packet, analyses this packet to determine whether an action is necessary and propagates the SYN packet in the direction of the receiver 1006. During the analysis of the SYN packet containing the header MP_CAPABLE and the header INFO_SUBFLOW, the INC 1002 recovers information on the source 1001, and in particular an IP address of the source 1001 and a port number of the source 1001. If the INC does not already have this information, the INC saves it in memory and associates it with an identifier of the source. The INC next associates, with the saved information, information on the MPTCP subflow currently being created, in particular a key extracted from the header MP_CAPABLE, a subflow identifier and an address identifier. The INC also saves information indicating that the source 1001 is compatible with the MPTCP+ method since the field Seq_Req 1406 of the header INFO_SUBFLOW is absent, indicating that the header INFO_SUBFLOW was added by the source 1001. The INCs 1003, 1004 and 1005 apply respectively steps 403, 404 and 405 identical to step 402.

Figure 14B:
FIG. 14B shows schematically an SYN/ACK or ACK packet of the MANAGE_SUBFLOW type comprising an INFO_SUBFLOW header according to the invention.

Following reception of the SYN packet, the receiver 1006 constructs and sends in the direction of the source 1001, during a step 406, an SYN/ACK packet with a header MP_CAPABLE and a header INFO_SUBFLOW. FIG. 14B describes an SYN/ACK packet and ACK packet header of the INFO_SUBFLOW type. The fields 1410, 1411, 1412 and 1413, respectively called Kind, Length, SubType and Sub-SubT, are identical to those of an SYN packet described in relation to FIG. 14A. These fields are followed by a field 1414, called TypeOfLink in accordance with conventional terminology of transport protocols, coded for example in 6 bits, giving indications on the first link. For example, the field TypeOfLink 1414 can give indications on transmission times over the link, on a transmission rate on the link, on a transmission cost on the link, etc. The field TypeOfLink 1414 is followed by a field 1415, referred to as A, and a field 1416 referred to as B, allowing to identify a cryptography algorithm used during transmissions of data in the initial MPTCP subflow.

During a step 406, the field TypeOfLink 1414 is set to a value giving indications on the first link, and the fields A 1415 and B 1416 are set respectively to a value allowing to identify the encryption algorithm used. In a step 407, the INC 1005 analyses the SYN/ACK packet in order to check whether an action is necessary and transmits the packet in the direction of the source 1001. When an SYN/ACK packet containing the header MP_CAPABLE and the header INFO_SUBFLOW is analysed, the INC 1005 recovers information on the receiver 1006 comprising an IP address of the receiver 1006 and a port number of the receiver 1006. If the INC 1005 does not already have this information, it saves it in memory and associates it with an identifier of the receiver 1006. The INC next associates, with the saved information, information on the MPTCP subflow being created, comprising a key extracted from the header MP_CAPABLE, a subflow identifier and an address identifier, each identifier taking a default value equal to "0" as specified by the MPTCP protocol. The key is used to protect the opening of MPTCP supplementary subflows. The INC also saves information indicating that the receiver 1006 is compatible with the MPTCP+ method, which it can deduce from the presence of the fields TypeOfLink 1414, A 1415 and B 1416 in the header INFO_SUBFLOW. The INCs 1004, 1003 and 1002 apply respectively steps 408, 409 and 410 identical to step 407.

Following the reception of the SYN/ACK packet, the source 1001 constructs and sends an ACK packet in the direction of the receiver 1006 during a step 411, this packet containing headers MP_CAPABLE and INFO_SUBFLOW. The syntax of the header INFO_SUBFLOW of an ACK packet is identical to the syntax of the header INFO_SUBFLOW of an SYN/ACK packet. During step 411, the fields TypeOfLink 1414, A 1415 and B 1416 are copied from the SYN/ACK packet. In a step 412, the INC 1002 analyses the ACK packet in order to check whether an action is necessary and transmits the packet in the direction of the receiver 1006. When an ACK packet is analysed, the INC checks that all the information concerning the connection and the initial MPTCP subflow are coherent. In steps 413, 414 and 415, the INCs 1003, 1004 and 1005 apply steps identical to step 412. The initial MPTCP subflow is opened after reception by the receiver 1006 of the ACK packet.

In a second phase described in relation to steps 416 to 430, an additional MPTCP subflow is created on a second link identified by a second sextuplet. It should be noted that the IP address of the receiver of the second sextuplet may be equal to the IP address of the receiver of the first sextuplet. This phase begins with the creation and then the sending, by the source 1001 during a step 416, of an SYN packet comprising a header MP_JOIN+ and a header INFO_SUBFLOW. The header MP_JOIN+ of an SYN packet is similar to the conventional header MP_JOIN of an SYN packet. The syntax of a header MP_JOIN+ of an SYN packet is described in relation to FIG. 14C. The syntax of a header INFO_SUBFLOW of an SYN packet is the one described in relation to FIG. 14A.

The header MP_JOIN+ of an SYN packet contains fields 1420, 1421, 1422 typical of a header according to the MPTCP protocol, called respectively Kind, Length and SubType in accordance with the terminology of the MPTCP protocol. The field 1422 SubType allows to identify the header MP_JOIN+. The header MP_JOIN+ also comprises a field 1423, called MaxSf, coded for example on 3 bits, a field 1424, called SubFlow_Id, of variable size, and a field 1425, called Address_Id, of variable size. The field MaxSf 1423 indicates the number of bits allocated to the field SubFlow_Id 1424 and to the field Address_Id 1425, which, when the field MaxSf 1423 is coded on 3 bits, may range from 0 to 7 bits. The field SubFlow_Id 1424 allows to identify a subflow. The field Address_Id 1425 allows to identify the IP address of the network device that created the packet (i.e. a source or a destination) independently of the value of the corresponding IP address. The field Address_Id 1425 allows to recognise an IP address even if it has been modified in the network, for example by an address translation device. It should be noted that the fields SubFlow_Id 1424 and Address_Id 1425 of the header MP_JOIN+ replace a field Address_ID of a header MP_JOIN as defined in the MPTCP protocol. Moreover, the header MP_JOIN+ comprises a field 1427, called "receiver token (RT)", and a field 1428, called "source random number (SRN)". The fields RT 1427 and SRN 1428 are used to protect the MPTCP connection.

During step 416, the field Address_Id 1425 is positioned at a representative value at the IP address of the source of the second sextuplet. The field SubFlow_Id 1424 is positioned at a value allowing to represent the first subflow created from the second sextuplet. For example, the field SubFlow_Id 1424 takes the value "0". When an additional MPTCP subflow initiated by a source (or respectively a receiver) is created, the fields Sf_Id 1404 and Addr_Id 1405 of the header INFO_SUBFLOW of the SYN packet are not used. In one embodiment these fields take for example the value "0".

During a step 417, the INC 1002 receives the SYN packet, analyses this packet to determine whether an action is necessary and propagates the SYN packet in the direction of the receiver 1006. When the SYN packet containing the header MP_JOIN+ and the header INFO_SUBFLOW is analysed, the INC 1002 recovers information on the source comprising an IP address of the source and a port number of the source. If the INC 1002 does not already have this information, it saves it in memory and associates it with an identifier of the source. The INC 1002 next associates, with the saved information, information on the additional MPTCP subflow being created comprising the receiver token and the source random number, the subflow identifier and the address identifier extracted from the header MP_JOIN+ and a key.

When, prior to the reception of the SYN packet comprising the header MP_JOIN+, the INC 1002 has received a packet comprising a header MP_CAPABLE (as is the case in the example in FIG. 4), the key associated with the saved information is the one received during the step 402 of reception of the packet containing the header MP_CAPABLE.

However, it is possible for a reception by an INC of an SYN packet containing the header MP_JOIN+ not to be preceded by a reception of an SYN packet containing the header MP_CAPABLE. This case may occur when an SYN packet containing the option MP_CAPABLE has followed a first route in the network whereas an SYN packet containing the option MP_JOIN+ has followed a second route different from the first. In this case the key associated with the saved information is constructed by the INC from the receiver token and/or the source random number.

The INCs 1003, 1004 and 1005 apply respectively steps 418, 419 and 420 identical to step 417.

Following reception of the SYN packet, the receiver 1006 constructs and sends in the direction of the source 1001, during a step 421, an SYN/ACK packet with a header MP_JOIN+ and a header INFO_SUBFLOW. An SYN/ACK and ACK packet header of the MP_JOIN+ type is described in relation to FIG. 14D.

Figure 14C:
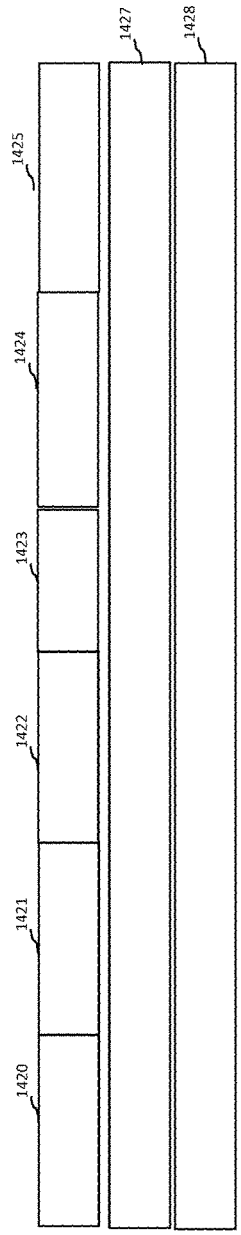
FIG. 14C shows schematically an MP_JOIN header of an SYN packet, modified according to the invention.
Figure 14D:
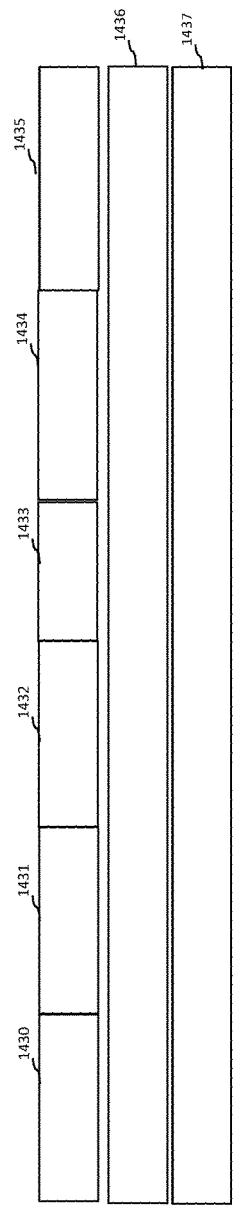
FIG. 14D depicts schematically an MP_JOIN header of an SYN/ACK or ACK packet, modified according to the invention.

The header MP_JOIN+ of an SYN/ACK or ACK packet comprises fields 1430, 1431, 1432, 1433, 1434 and 1435, called respectively Kind, Length, SubType, MaxSf, SubFlow Id and Address Id respectively identical to the fields 1420, 1421, 1422, 1423, 1424 and 1425, with the same names as a header MP_JOIN+ of an SYN packet described in relation to FIG. 14C. Moreover, the header MP_JOIN+ comprises a field 1436, called "source security number" known as HMAC in the MPTCP protocol, and a field 1437, called "source random number (SRN)". The fields HMAC 1436 and SRN 1437 are used to protect the MPTCP connection. The field HMAC 1436 is calculated from key, receiver token and/or source random number information exchanged between the source 1001 and the receiver 1006 during exchanges of packets comprising the header MP_CAPABLE or the header MP_JOIN+.

The syntax of a header INFO_SUBFLOW of an SYN/ACK packet is the one described in relation to FIG. 14B.

During step 421, the field Address_Id 1435 is positioned at a value corresponding to the receiver IP address of the second sextuplet, the field SubFlow_Id 1434 is positioned at the value "0" to represent the first subflow created for the second sextuplet, the field TypeOfLink 1414 of the header INFO_SUBFLOW is set to a value giving indications on the second path and the fields A 1415 and B 1416 are set respectively to a value allowing to identify the encryption algorithm used.

In a step 422, the INC 1005 analyses the SYN/ACK packet in order to check whether an action is necessary and transmits the packet in the direction of the source 1001. When an SYN/ACK packet containing the header MP_JOIN+ and the header INFO_SUBFLOW is analysed, the INC 1005 recovers information on the receiver comprising an IP address of the receiver and a port number of the receiver. If the INC 1005 does not already have this information, it saves it in memory. The INC 1005 next associates, with the saved information, information on the MPTCP subflow being created comprising a key, the source random number, the MPTCP subflow identifier and the receiver address identifier extracted from the header MP_JOIN+ of the SYN/ACK packet. In a manner similar to step 417, the key is the one obtained during step 407 if an SYN/ACK packet comprising the header MP_CAPABLE has been received by the INC 1005 or a key constructed by the INC 1005 from the source random number.

The INCs 1004, 1003 and 1002 apply respectively steps 423, 424 and 425 identical to step 422.

Following the reception of the SYN/ACK packet, the source 1001 constructs and sends, during a step 426, an ACK packet in the direction of the receiver 1006, this packet comprising the headers MP_JOIN+ and INFO_SUBFLOW. During step 426, the fields TypeOfLink 1414, A 1415 and B 1416 are copied from the SYN/ACK packet. In a step 427, the INC 1002 analyses the ACK packet in order to check whether an action is necessary and transmits the packet in the direction of the receiver 1006. When an ACK packet is analysed, the INC 1002 checks that all the information relating to the connection and the additional MPTCP subflow are coherent. In steps 428, 429 and 430, the INCs 1003, 1004 and 1005 apply respectively steps identical to step 427. The additional MPTCP subflow is opened after reception by the receiver 1006 of the ACK packet.

FIG. 4 describes a phase of opening an initial MPTCP subflow and an additional MPTCP subflow. Other additional MPTCP subflows could be created during this phase by repeating steps 416 to 430 with other sextuplets, as long as source and receiver addresses are available. This phase is followed by a data packet transfer phase that is in every respect identical to a data packet transfer phase according to the MPTCP protocol. When accelerated processing procedures are available in the INCs 1002 to 1005, these are implemented on the data packets transmitted during the data packet transfer phase.

The data packet transfer phase is followed by an MPTCP subflow closure phase. This closure phase is in every respect identical to a closure phase according to the MPTCP protocol. The closure phase according to the MPTCP protocol may be based on the use of a FIN packet or an RST packet as defined in the MPTCP protocol. In the case of the use of a FIN packet, the closure phase comprises the transmission of a FIN packet by the source 1001 followed by the transmission of an acknowledgement of reception of the FIN packet by the receiver 1006. In this way the MPTCP subflow is closed at the source 1001. The MPTCP subflow is next closed at the receiver 1006.

The receiver 1006 transmits a FIN packet to the source 1001. The source 1001 responds by transmitting an acknowledgement of receipt of the FIN packet to the receiver 1006. In this way the MPTCP subflow is closed at the receiver 1006. When they pass through the INCs 1002 to 1005, the FIN packets are analysed, which enables the INCs to delete the information relating to the MPTCP subflow thus closed in the memory of said INCs.

The use of the MPTCP+ method described in relation to FIG. 4 represents a creation of two MPTCP subflows initiated by the network unit 1001. In another use of the MPTCP+ method, the creation of the two subflows can be initiated by the receiver 1006, since the method is reversible.

Moreover, the communication network used in the implementation of the MPTCP+ method in FIG. 4 comprises one INC on the source LAN, one INC on the receiver LAN and two INCs on the WAN part of the network. The method functions in the same way in another configuration, for example with at least one INC compatible with the MPTCP+ method on at least one of the LANs and/or at least one INC compatible with the MPTCP+ method on the WAN.

Figure 5:
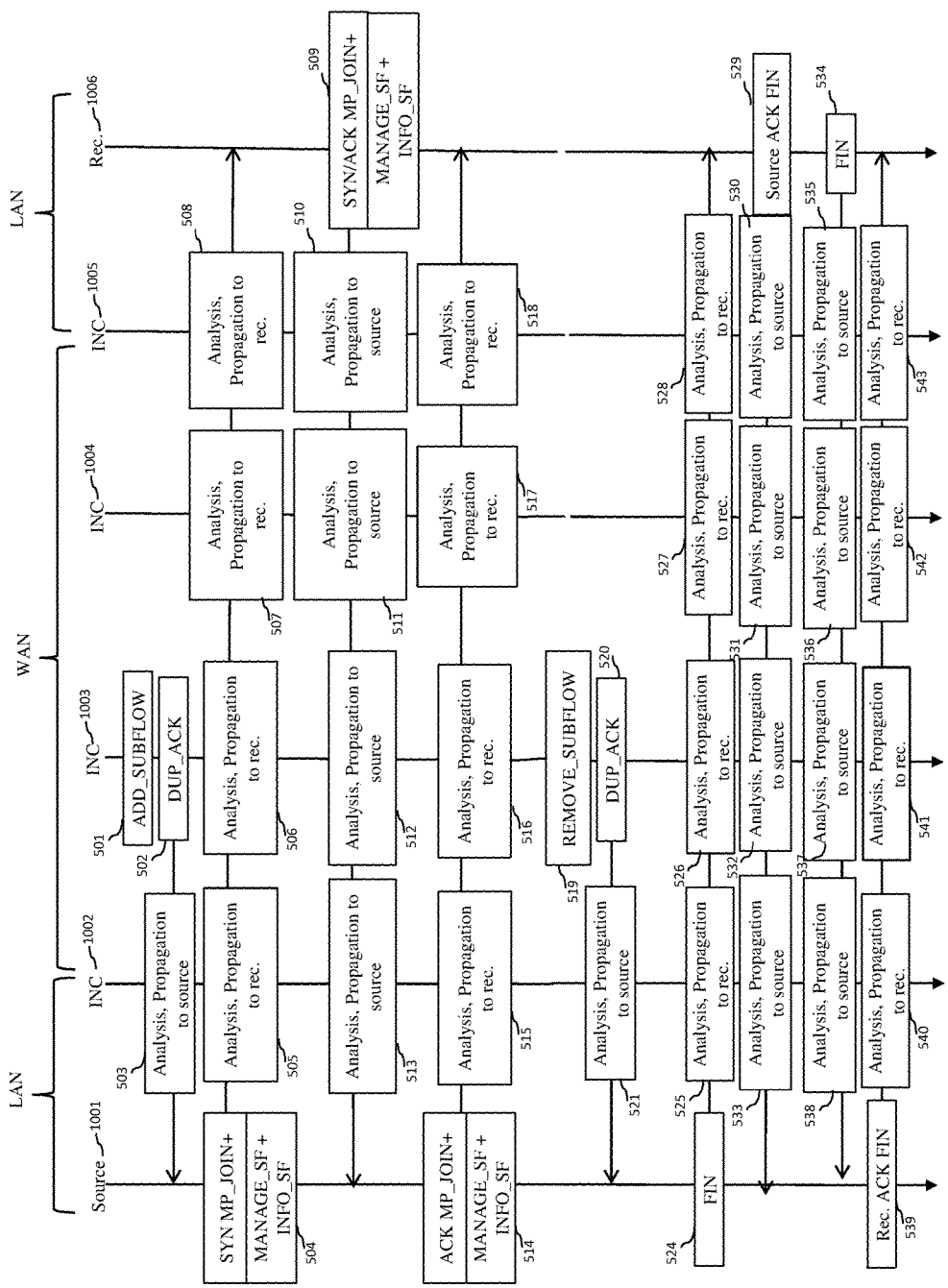
FIG. 5 depicts schematically an example of implementation of a method according to the invention for creating a supplementary MPTCP subflow following the opening of a new path in a network, and then of a method according to the invention for deleting said supplementary MPTCP subflow.

In the example in FIG. 4, no intermediate path has been opened on the network. FIG. 5 shows schematically an example of implementation of a method according to the invention for creating a supplementary MPTCP subflow, then of a method according to the invention for deleting said supplementary MPTCP subflow, following an opening of a new path in the network in FIG. 1. In the example in FIG. 5, an intermediate path opens from the INC 1003 and in the direction of the receiver 1006.

Following the opening of the intermediate path, a procedure for creating a supplementary MPTCP subflow using the intermediate path is launched. The procedure for creating a supplementary MPTCP subflow comprises a procedure for signalling an opening of a new intermediate path described in relation to steps 501 to 503 and a three-way handshake procedure described in relation to steps 504 to 518.

The supplementary MPTCP subflow must share the source and receiver IP addresses of an existing initial or additional MPTCP subflow. If it is considered for example that the implementation of the example in FIG. 5 follows the implementation of the example in FIG. 4, the supplementary MPTCP subflow shares for example the source and receiver IP addresses of the initial MPTCP subflow created in steps 401 to 415.

Figure 14E:
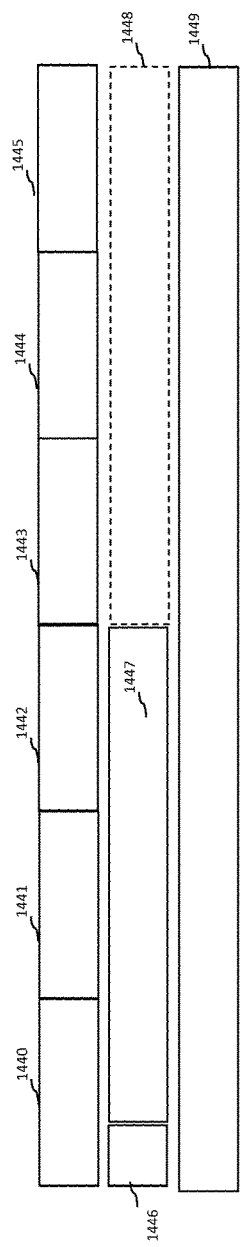
FIG. 14E shows schematically a header of the MANAGE_SUBFLOW type comprising an ADD_SUBFLOW header according to the invention.

The procedure for signalling an opening of a new intermediate path begins with step 501, during which the INC 1003 constructs a header MANAGE_SUBFLOW comprising a subheader ADD_SUBFLOW, the syntax of which is described in relation to FIG. 14E. Hereinafter, to simplify, a header MANAGE_SUBFLOW comprising a subheader ADD_SUBFLOW is referred to as "header ADD_SUB-FLOW". The header ADD_SUBFLOW comprises fields 1440, 1441, 1442 and 1443, called respectively Kind, Length, Subtype and SubSubT respectively identical to the fields Kind 1400, Length 4001, Subtype 1402 and SubSubT 1403 of the header INFO_SUBFLOW described in relation to FIG. 14A. The header ADD_SUBFLOW comprises in addition a field 1444, called SF_Id, and a field 1445 called Addr_Id. The fields SF_Id 1444 and Addr_Id 1445 allow to indicate to the addressee of the packet containing the header ADD_SUBFLOW (here the source 1001) which MPTCP subflow to duplicate. In the example in FIG. 5, the fields SF_Id 1444 and Addr_Id 1445 represent respectively an identifier of an MPTCP subflow of the source 1001 and an identifier of the address of the source 1001. Moreover, the header ADD_SUBFLOW comprises a field 1446, referred to as D, for example with a length of 1 bit, indicating which of the source or receiver must initiate the creation of the supplementary MPTCP subflow, a field 1447 called Seq_Req, for example of size 15 bits, used to identify which INC originates the creation of the subflow, an optional field 1448, called Port, for example of size 16 bits, allowing to identify a port used for initiating the creation of the subflow, and a field 1449, called "security number" HMAC, used for protecting a subflow transmission, coded for example in 32 bits.

During step 501, the INC 1003 positions the fields SF_Id 1444 and Addr_Id 1445 at values allowing to identify which initial or additional MPTCP subflow must serve as a basis for the creation of the supplementary MPTCP subflow. Since, in the example in FIG. 5, it is the initial MPTCP subflow that is used, the fields SF_Id 1444 and Addr_Id 1445 take the value "0". The field D 1446 takes the value "0" in order to indicate that it is for the source 1001 to initiate the creation of the supplementary MPTCP subflow, i.e. it is for the source 1001 to send the first SYN packet of the three-way handshake procedure. The field Seq_Req 1447 takes a random value "AL1" determined by the INC 1003. The random value "AL1" of the field Seq_Req 1447 is stored in the memory of the INC 1003. In this example, the optional field Port 1448 is not used.

The procedure for signalling an opening of a new intermediate path continues with step 502, during which the header ADD_SUBFLOW is inserted in at least one packet and sent in the direction of the source 1001. In one embodiment, identical headers ADD_SUBFLOW are inserted in a plurality of the packets, so as to ensure good reception of at least one packet comprising the header ADD_SUBFLOW by the source 1001. The packets used are packets intended for the source 1001 or duplicated receipt-acknowledgement packets of the DUP_ACK (duplicate acknowledgement) type specially created by the IMC 1003 if the packets intended for the source 1001 cannot be used. The packets intended for the source 1001 may be any type of packet used during communication between the source 1001 and the receiver 1006.

The packets comprising the header ADD_SUBFLOW can be transported in an existing MPTCP subflow intended for the source, in a plurality of existing MPTCP subflows intended for the source, or even in all the existing MPTCP subflows intended for the source passing through the INC 1003

Any conventional packet intended for the source 1001 benefits, when it is available in an INC from an accelerated-processing procedure implemented for example by the device for the accelerated processing of data packets of the device 21 included in an INC. This conventional packet is therefore not processed by the processor 210 of the device 21, which prevents the device 21 from applying a particular processing to this packet. In the context of the invention, it is necessary to apply a particular processing to certain packets, either to insert headers ADD_SUBFLOW therein or to create DUP_ACK packets from these packets in order to insert ADD_SUBFLOW headers therein. In one embodiment, when an INC implements an accelerated-processing procedure, this procedure is interrupted temporarily when opening of the intermediate path is detected. In this way, the packets received by the INC are processed by the processor 210 of the device 21. The INC can then introduce the header ADD_SUBFLOW in packets intended for the source 1001 or create DUP_ACK packets containing the header ADD_SUBFLOW if it cannot insert the header ADD_SUB-FLOW in the packets intended for the source 1001. The INC can next reactivate the accelerated processing procedure. It is assumed here that each INC is capable of detecting an appearance or disappearance of intermediate paths by implementing a network event monitoring procedure.

Hereinafter, we describe various embodiments in which the headers ADD_SUBFLOW (but also headers REMOVE_SUBFLOW that we describe later in relation to procedures for closing supplementary MPTCP subflows) are inserted in DUP_ACK packets. These embodiments are however in no way restrictive and any other type of packet passing through an INC originating an opening (or respectively of a closure) of a supplementary MPTCP subflow can be used to transmit headers ADD_SUBFLOW (or respectively REMOVE_SUBFLOW).

In the example in FIG. 5, under the control of the processor 210, the INC 1003 inserts the header ADD_SUB- FLOW in the DUP_ACKs intended for the source. The accelerated-processing procedure is next reactivated by the processor 210 of the device 21 of the INC 1003 after the sending of the DUP_ACK packets containing the header ADD_SUBFLOW.

When it receives a DUP_ACK packet during step 503, the INC 1002 treats it as a conventional DUP_ACK packet and propagates it in the direction of the source 1001.

Following the reception of the DUP_ACK packet containing the header ADD_SUBFLOW, the source 1001 initiates a three-way handshake procedure. The three-way handshake procedure begins with the creation and then the sending by the source 1001, during step 504, of an SYN packet containing a header MP_JOIN+ and a header INFO_SUBFLOW. The SYN packet created during step 504 is similar to the SYN packet created during step 416. The field Address_Id 1425 of the header MP_JOIN+ of the SYN packet created during step 504 takes the same address identifier value as the SYN packet created during step 401. On the other hand, so as to distinguish the initial MPTCP subflow from the supplementary MPTCP subflow, the source 1001 positions the field SubFlow_Id 1424 at a value different from the one associated with the initial MPTCP subflow. For example, when a first MPTCP subflow is created for a sextuplet, it is associated by default with an MPTCP subflow identifier with the value "0". When a second MPTCP subflow is created for the same sextuplet, it is associated with an MPTCP subflow identifier with a value "1" and so on by increments of one unit until all possible MPTCP subflow identifier values have been exhausted. As during step 416 of creation of an additional MPTCP subflow, the fields Sf_Id 1404 and Addr_Id 1405 of the header INFO_SUBFLOW are not used. In one embodiment these fields take for example the value "0". Moreover, since here it is an INC that originates the creation of a supplementary MPTCP subflow, a field Seq_Req 1406 is inserted in the header INFO_SUBFLOW. The field Seq_Req 1406 of the header INFO_SUBFLOW takes the random value "AL1".

During steps 505 to 508, the INCs 1002 to 1005 receive, analyse and propagate the SYN packet in the direction of the receiver 1006.

The analysis used during step 505 is identical to the analysis used during step 402. The outgoing path of the each INC corresponds to the outgoing path used by the initial or additional MPTCP subflow identified in the header ADD_SUBFLOW.

During step 506, the INC 1003 determines, by reading the field Seq_Req 1406 of the header INFO_SUBFLOW, that this SYN packet relates to the procedure for creating the supplementary MPTCP subflow which it originates. By virtue of this finding, the INC 1003 knows that it must use the recently opened intermediate path and that the SYN packet must be propagated to the receiver 1006 using this intermediate path.

The analyses used during steps 507, 508 are respectively identical to the analyses used during steps 404, 405.

Following reception of the SYN packet, the receiver 1006 constructs and sends, during step 509, an SYN/ACK packet with a header MP_JOIN+ and a header INFO_SUBFLOW. During step 509, the field Address_id 1435 of the header MP_JOIN+ of the SYN/ACK packet takes an address identifier value corresponding to the address used for transmitting the SYN/ACK packet created during step 406. On the other hand, so as to distinguish the initial MPTCP subflow from the supplementary MPTCP subflow, the receiver 1006 positions the field SubFlow_Id 1434 at a value different from the one associated with the initial MPTCP subflow by taking for example the value "1". With regard to the header INFO_SUBFLOW, the field TypeOfPath 1414 is set to a value giving information on the path used and the fields A 1415 and B 1416 are set respectively to a value allowing to identify the encryption algorithm used.

Steps 510 to 518, which end the three-way handshake procedure, are then identical respectively to steps 422 to 430. The supplementary MPTCP subflow is opened when the ACK packet is received by the receiver 1006.

The opening of the supplementary subflow according to the MPTCP+ method is followed by a data packet transfer phase using the intermediate path. When accelerated processing procedures are available in the INCs 1002 to 1005, they are implemented on the data packets transmitted during the data packet transfer phase.

When this data packet transfer phase ends, a phase of closure of the supplementary MPTCP subflow is implemented. The phase of closing the supplementary MPTCP subflow can be initiated by the source 1001 or the receiver 1006. In this case, the closure phase is all respects identical to a closure phase according to the MPTCP protocol based on a FIN packet exchange and acknowledgements of reception of the FIN packets.

Figure 14F:
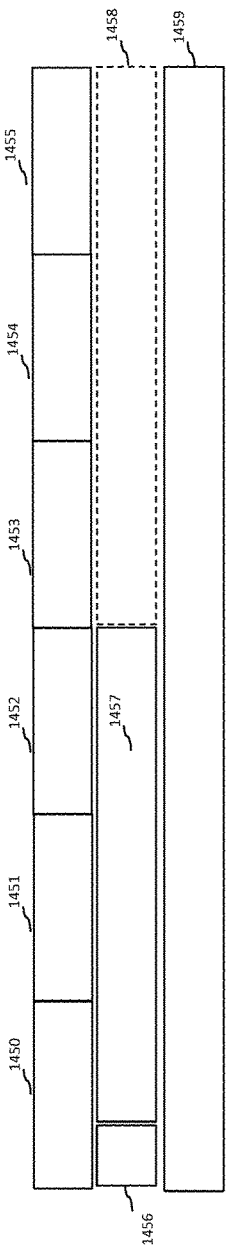
FIG. 14F shows schematically a header of the MANAGE_SUBFLOW type comprising a REMOVE_SUBFLOW header according to the invention.

In one embodiment, the closure phase is initiated by the INC that gave rise to the request to create the supplementary MPTCP subflow, i.e. by the INC 1003 in the example in FIG. 5. In this case, the closure phase follows a procedure specific to the MPTCP+ method. This procedure is described in relation to steps 519 to 521 and 524 to 543 in FIG. 5. This procedure begins with the creation, during a step 519, of a header of the type REMOVE_SUBFLOW. The header REMOVE_SUBFLOW is described in relation to FIG. 14F. The header REMOVE_SUBFLOW is identical to the header ADD_SUBFLOW. A field 1453 of the header REMOVE_SUBFLOW, called SubSubT, takes a value allowing to identify the header REMOVE_SUBFLOW.

Fields 1454 and 1455, called respectively SF_Id and Addr_Id by analogy with the fields 1444 and 1445 of the header ADD_SUBFLOW, take values allowing to determine which MPTCP subflow must be closed. In the example in FIG. 5, it is the supplementary MPTCP subflow that must be closed. The fields SF_Id 1454 and Addr_Id 1455 therefore take respectively the values "1" and "0". A reserved field 1457 is inserted for alignment purposes. A field 1456, called D by analogy with the field 1446 of the header ADD_SUBFLOW of the header REMOVE_SUBFLOW, takes a value indicating to the source 1001 that it must initiate a procedure of closing the supplementary MPTCP subflow. In this example, a field 1458, called Port by analogy with the field 1448 of the header ADD_SUBFLOW, is not used.

The header REMOVE_SUBFLOW created during step 519 is inserted in at least one reception acknowledgement packet of the type DUP_ACK created by the INC 1003 and intended for the source 1001. A sending of a plurality of packets transporting the header REMOVE_SUBFLOW ensures that the header REMOVE_SUBFLOW is indeed received by its addressee, here the source 1001. Each packet transporting the header REMOVE_SUBFLOW can be sent using a different initial, additional or supplementary subflow. When an addressee receives the same header REMOVE_SUBFLOW on several occasions, only the header REMOVE_SUBFLOW received first is considered.

The INC 1002 receives the DUP_ACK packet containing the header REMOVE_SUBFLOW and transmits it in the direction of the source 1001.

When the source 1001 receives the DUP_ACK packet containing the header REMOVE_SUBFLOW, it initiates a phase of closing the supplementary MPTCP subflow in every respect identical to a closure phase according to the MPTCP protocol based on an exchange of FIN packets and acknowledgements of reception of the FIN packets. This phase begins, in a step 524, with the sending by the source 1001 of a FIN packet in the direction of the receiver 1006. In steps 525 to 528, the INCs 1002 to 1005 analyse and propagate the FIN packet in the direction of the receiver 1006. During analyses of steps 526 to 528, the INCs 1002 to 1005 note that the supplementary subflow is being closed.

The reception of the FIN packet by the receiver 1006 causes, during a step 529, the sending of an acknowledgement of receipt of the FIN packet in the direction of the source. During steps 530 to 533, the INCs 1005 to 1002 analyse and propagate the acknowledgement of receipt of the FIN packet in the direction of the source 1001. During analyses of steps 530 to 533, the INCs 1005 to 1002 note that the phase of closure of the supplementary subflow initiated by the source is ending.

During a step 534, the receiver 1006 in its turn initiates a phase of closure of the supplementary MPTCP subflow. This phase begins with a sending by the receiver 1006 of an FIN packet in the direction of the source 1001. During steps 535 to 538, the INCs 1005 to 1002 analyse and propagate the FIN packet in the direction of the source 1001. During analysis of steps 535 to 538, the INCs 1005 to 1002 determine that a phase of closure of the supplementary MPTCP subflow is under way.

The reception of the FIN packet by the source causes, during a step 539, the sending of an acknowledgement of receipt of the FIN packet in the direction of the receiver 1006. During steps 540 to 543, the INCs 1002 to 1005 analyse and propagate the acknowledgement of receipt in the direction of the receiver 1006. During analyses of steps 540 to 543, the INCs 1002 to 1005 determine that the phase of closure of the supplementary MPTCP subflow initiated by the receiver 1006 is ending. Each INC then deletes all references to the supplementary MPTCP subflow stored in its memory. The source 1001 and the receiver 1006 also delete all references to the supplementary MPTCP subflow stored in their respective memories.

A request to create a supplementary MPTCP subflow by an INC uses parts of packets that are not protected (e.g. signalling in a TCP packet where the headers of the present invention can be inserted). There therefore exists a not insignificant probability that said request to create an MPTCP+ subflow will not be successful. In one embodiment, a time delay is activated in each INC involved in the creation of a supplementary MPTCP+ subflow after the end of the three-way handshake procedure. This time delay takes a predefined duration d that can be fixed during a phase of configuration of each INC. During the time delay, any new creation of an MPTCP+ subflow by the INC is blocked. By blocking the creations of new MPTCP+ subflows during the period d of the time delay, it is ensured that the creation of each MPTCP+ subflow has succeeded before requesting the creation of a new MPTCP+ subflow.

We saw above that the procedure for creating an initial or additional MPTCP subflow was in general reversible and could be initiated by the source 1001 or the receiver 1006. A procedure for creating an initial or additional MPTCP subflow initiated by a receiver may occur for example when a new IP address is created or becomes available at the receiver. This procedure initiated by the receiver may however require additional steps when for example an INC implements an address-translation procedure preventing the routing of a SYN packet comprising a header MP_CAPABLE and a header INFO_SUBFLOW.

FIG. 6A shows schematically a procedure implemented in the context of the invention when an INC of the network address translator (NAT) type prevents the creation of an initial or additional MPTCP subflow in the network described in relation to FIG. 1 in the case where the INC 1005 implements an address translation procedure. In this example, following the opening of a new IP address on the receiver 1006, the receiver 1006 initiates a procedure of creating an additional MPTCP subflow by creating and sending, in a step 601, an SYN packet containing a header MP_CAPABLE and a header INFO_SUBFLOW. During a step 602, the packet SYN is received by the INC 1005. The INC 1005 applies an address-translation procedure leading to the loss of the packet since, for example, it is situated in the destination address field of the packet (here the address of the source 1001), an address that it does not know.

Following the sending of the SYN packet, the receiver 1006 awaits the reception of an SYN/ACK packet. If no SYN/ACK packet is received in a predefined time T after the sending of the SYN packet, the receiver creates and sends, in the direction of the source 1001, in a step 605, at least one packet of the DUP_ACK type containing a header of the ADD_ADDR2 type. The DUP_ACK packet may be sent several times in order to ensure that it is received by the source 1001. In one embodiment it is sent on each existing initial, additional and supplementary subflow. The syntax of a header ADD_ADDR2 is described in relation to FIG. 14G. The header ADD_ADDR2 comprises the fields 1460, 1461 and 1462, called respectively Kind, Length and SubType, typical of a header according to the MPTCP protocol. These three fields are followed by a field 1463, called IP Ver, allowing to determine the size of a field 1466 Address_IP containing an IP address and described hereinafter. The field IPVer 1463 is followed by a field 1465, called Addr_Id, intended to contain an IP address identifier. The field Addr_Id 1465 is followed by the field Address_IP 1466, by an optional field 1467, called port, intended to receive a port number, and by a field 1468, called "security number" HMAC, used to protect the transmission of the MPTCP subflow.

When the DUP_ACK packet is created in step 605, the receiver 1006 inserts the new IP address of the receiver in the field Address_IP 1466 and an identifier of this address in the field Addr_Id 1465.

The packet DUP_ACK is received and retransmitted by the INCs 1002 to 1005 without the latter having to perform any action on this packet. The DUP_ACK packet is next received by the source 1001. Following the reception of the DUP_ACK packet containing the header ADD_ADDR2, the source 1001 initiates a three-way handshake procedure by exchanging SYN, SYN/ACK and ACK packets, comprising headers MP_JOIN+ and INFO_SUBFLOW, between the source 1001 and the receiver 1006. This procedure is similar to the procedure described in relation to steps 416 to 430 of FIG. 4. However, in this case, it is the new IP address of the receiver 1006 that the source 1001 has been able to find in the ADD_ADDR2 packet that is used in the sextuplet for creating the MPTCP subflow.

It happens that, on a network unit such as a source or a receiver, an IP address in the course of use may become suddenly unusable. In this case, the MPTCP subflows relating to this address can no longer be used. The invention proposes a procedure allowing to delete a set of MPTCP subflows relating to an IP address.

Figure 14G:
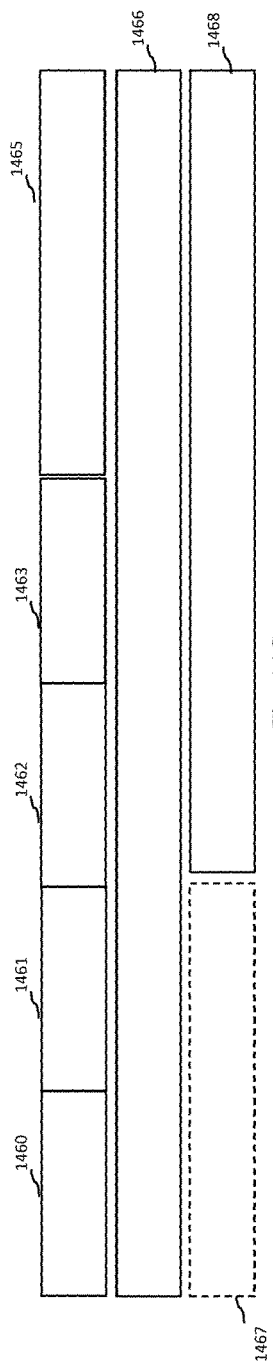
FIG. 14G shows schematically a header of the ADD_ADDR2 type according to the invention.

FIG. 6B shows schematically an example of implementation of a procedure for deleting each subflow of an MPTCP connection relating to an IP address of a receiver. This procedure relies on a header of the REMOVE_ADDR type. FIG. 14I shows schematically a header of the REMOVE_ADDR type according to the invention. Fields 1480, 1481 and 1482, called respectively Kind, Length and SubType, typical of a header according to the MPTCP protocol, are found in the header REMOVE_ADDR. The field SubType 1482 allows to identify the header REMOVE_ADDR. The field SubType 1482 is followed by a reserved field 1483, called Reserved, and by a field 1484, called Addr_Id. The field Addr_Id 1484 is able to transport an identifier of an IP address. The field Addr_Id 1484 can, for example, transport an identifier of an IP address that has become suddenly unusable.

In the example embodiment described in relation to FIG. 6B, we assume that an IP address of the receiver 1006 disappears whereas this IP address was used for a plurality of MPTCP subflows.

During a step 610, the receiver 1006 creates a header REMOVE_ADDR in which an identifier of the unusable IP address is inserted in the field Addr_Id 1484. The header REMOVE_ADDR is next inserted in one or more DUP_ACK packets and sent to the source 1001 in MPTCP subflows still available (i.e. not using the unusable IP address). Each INC passed through that would analyse a DUP_ACK packet containing the header REMOVE_ADDR would delete from its memory any reference to existing MPTCP subflows using the IP address indicated by the field Addr_Id 1484. When the source 1001 receives a DUP_ACK packet containing the header REMOVE_ADDR, it closes each subflow using the IP address indicated by the field Addr_Id 1484. In this way, each subflow to which the unusable IP address relates is definitively deleted at the source 1001, the receiver 1006 and the INCs 1002 to 1005. It should be noted that an identical procedure can be implemented by the source 1001 if one of its IP addresses becomes unusable.

Figure 7A:
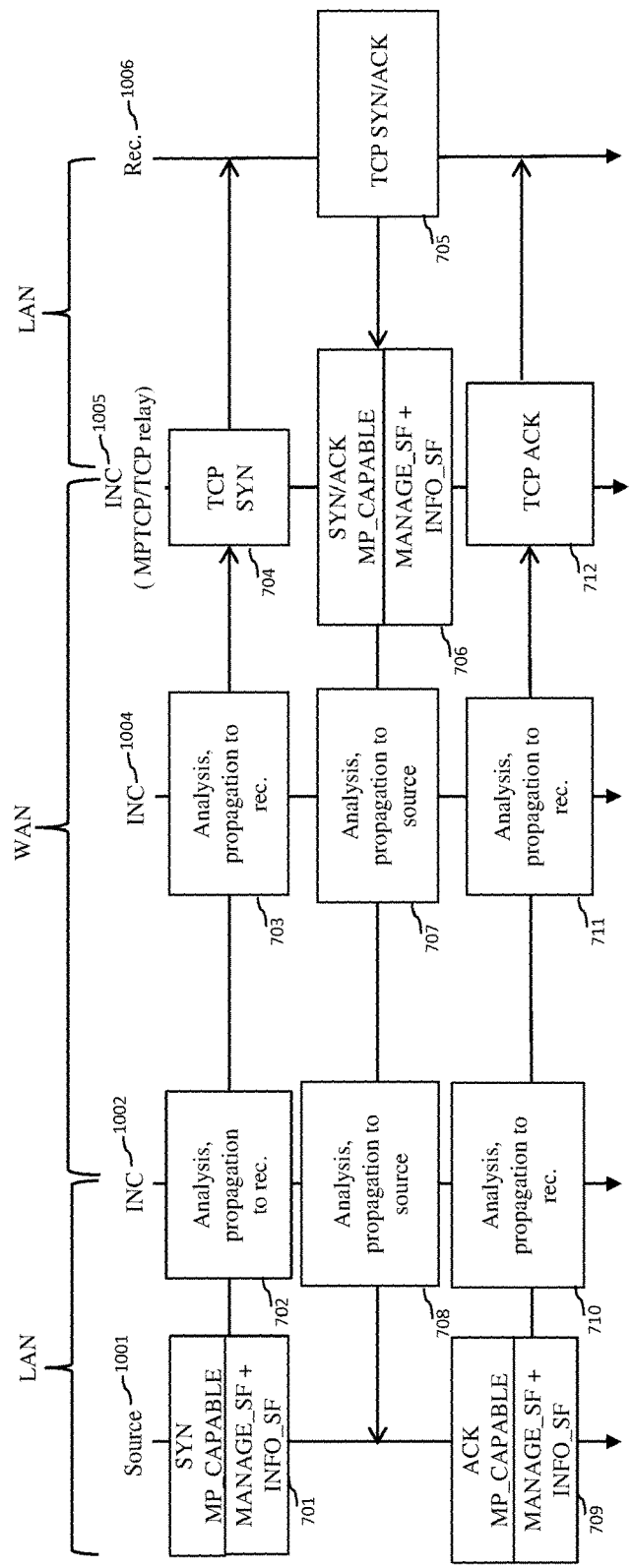
FIG. 7A depicts schematically an example of implementation of a method according to the invention for creating an initial MPTCP subflow in a network in which a source able to implement the invention communicates with a TCP receiver.

FIG. 7A shows schematically an example of an implementation of a method according to the invention for creating an initial MPTCP subflow, referred to as the relayed initial MPTCP subflow, in a network in which a source able to implement the MPTCP+ method communicates with a TCP receiver. We repeat here the network described in relation to FIG. 1. For reasons of clarity, the INC 1003 is not shown. In this example, the INC 1005 is a TCP/MPTCP relay as described above.

Hereinafter, SYN, SYN/ACK and ACK packets used to create an MPTCP subflow are referred to respectively as MPTCP SYN packet, MPTCP SYN/ACK packet and MPTCP ACK packet. Moreover, SYN, SYN/ACK and ACK packets used to create a TCP flow are respectively referred to as TCP SYN packet, TCP SYN/ACK packet and TCP ACK packet.

As we describe below, two three-way handshake procedures are implemented in this case. A first three-way handshake procedure is implemented in the source 1001 and the INC 1005 fulfilling the role of TCP/MPTCP relay and allows to create the relayed initial MPTCP subflow, and a second three-way handshake procedure between the INC 1005 and the receiver 1006 allows to create a TCP flow, referred to as a relay TCP flow. The first three-way handshake procedure is initiated directly by the source 1001 whereas the second three-way handshake procedure is initiated indirectly by the source 1001 by means of the INC 1005.

In a step 701 identical to step 401, the source 1001 creates and sends an MPTCP SYN packet with a conventional header MP_CAPABLE and a header INFO_SUBFLOW. During steps 702 and 703, the INCs 1002 and 1004 implement steps respectively identical to steps 402 and 404. In a step 704, the INC 1005 receives the MPTCP SYN packet.

In response to the MPTCP SYN packet, the INC 1005 constructs and sends, during a step 706, an MPTCP SYN/ACK packet with a header MP_CAPABLE and a header INFO_SUBFLOW. Step 706 implemented by the INC 1005 is identical to step 406 implemented by the receiver 1006. When the MPTCP SYN/ACK packet is received, the INCs 1004 and 1002 implement steps 707 and 708 respectively identical to steps 408 and 410.

In response to the MPTCP SYN/ACK packet, the source 1001 constructs and sends, during a step 709, an MPTCP ACK packet with a header MP_CAPABLE and a header INFO_SUBFLOW. Step 709 implemented by the source 1001 is identical to step 411. When the MPTCP ACK packet is received, the INCs 1002 and 1004 implement steps 710 and 711 respectively identical to steps 412 and 414. The reception of the MPTCP ACK packet by the INC 1005 ends the three-way handshake procedure between the source 1001 and the INC 1005. The relayed initial MPTCP subflow is then created between the source 1001 and the INC 1005, and a data transmission using this relayed initial MPTCP subflow can begin.

Moreover, during step 704, the INC 1005 constructs a TCP SYN packet, inserts the data contained in the MPTCP SYN packet in the TCP SYN packet and sends the TCP SYN packet to the receiver 1006.

In response to the TCP SYN packet, the receiver 1006 constructs and transmits a TCP SYN/ACK packet to the INC 1005 during a step 705.

In response to the TCP SYN/ACK packet, the INC 1005 constructs and transmits a TCP ACK packet to the receiver 1006 during a step 712. The reception of the TCP ACK packet by the receiver 1006 ends the three-way handshake procedure enabling the relay TCP flow to be created between the INC 1005 and the receiver 1006. The relay TCP flow can then be used to communicate between the INC 1005 and the receiver 1006.

When data are transmitted from the source 1001 to the receiver 1006, the INC 1005 extracts the data contained in MPTCP packets of the relayed initial MPTCP subflow and inserts them in TCP packets of the relay TCP flow. Conversely, when data are transmitted from the receiver 1006 to the source 1001, the INC 1005 extracts the data contained in the TCP packets of the relay TCP flow and inserts them in MPTCP packets of the relayed initial MPTCP subflow.

The relayed initial MPTCP subflow is released in a standard fashion, as explained in the MPTCP protocol. In one embodiment, the release of the relayed initial MPTCP subflow causes the release of the relay TCP flow that is associated with it. The relay TCP flow is released in a standard fashion, as explained in the TCP standard.

Figure 7B:
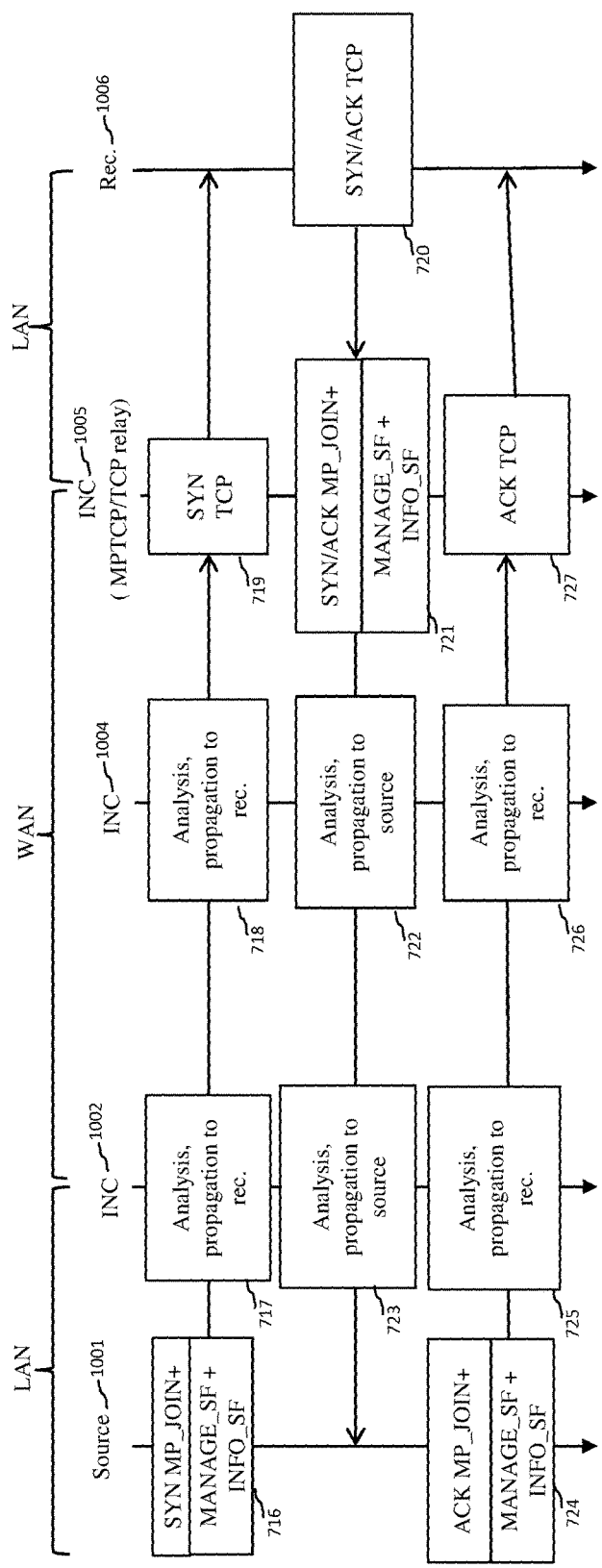
FIG. 7B depicts schematically an example of implementation of a method according to the invention for creating an additional MPTCP subflow in a network in which a source able to implement the invention communicates with a TCP receiver.

FIG. 7B shows schematically an example of implementation of a method according to the invention for creating an additional subflow of an MPTCT connection, referred to as a relayed additional MPTCP subflow, in a network in which a source able to implement the MPTCP+ method communicates with a TCP receiver. The network described in relation to FIG. 7A is repeated here.

In this example, a first three-way handshake procedure is implemented between the source 1001 and the INC 1005 fulfilling the role of a TCP/MPTCP relay and allows to create the relayed additional MPTCP subflow, and a second three-way handshake procedure between the INC 1005 and the receiver 1006 allows to create a relay TCP flow. However, it is not necessary to create a relay TCP flow specifically to relay the relayed additional MPTCP subflow. The relayed additional MPTCP subflow could be relayed by an existing relay TCP flow between the INC 1005 and the receiver 1006.

In a step 716 identical to step 416, the source 1001 creates and sends an MPTCP SYN packet with a header MP_JOIN+ and a header INFO_SUBFLOW during steps 717 and 718, the INCs 1002 and 1004 implement steps respectively identical to steps 417 and 419. In a step 719, the INC 1005 receives the MPTCP SYN packet.

In response to the MPTCP SYN packet, the INC 1005 constructs and sends, during a step 721, an MPTCP SYN/ACK packet with a header MP_JOIN+ and header INFO_SUBFLOW. Step 721 implemented by the INC 1005 is identical to step 421 implemented by the receiver 1006. When the MPTCP SYN/ACK packet is received, the INCs 1004 and 1002 implement steps 722 and 723 respectively identical to steps 423 and 425.

In response to the MPTCP SYN/ACK packet, the source 1001 constructs and sends, during a step 724, an MPTCP ACK packet with a header MP_JOIN+ and a header INFO_SUBFLOW. Step 724 implemented by the source 1001 is identical to step 426. When the MPTCP ACK packet is received, the INCs 1002 and 1004 implement steps 725 and 726 respectively identical to steps 427 and 429. The reception of the MPTCP ACK packet by the INC 1005 ends the three-way handshake procedure between the source 1001 and the INC 1005. The relayed additional MPTCP subflow is then created between the source 1001 and the INC 1005, and a transmission of data using this relayed additional MPTCP subflow can begin.

Moreover, during step 719, the INC 1005 constructs a TCP SYN packet, inserts the data contained in the MTPCP SYN packet in the TCP SYN packet and sends the TCP SYN packet to the receiver 1006.

In response to the TCP SYN packet, the receiver 1006 constructs and transmits a TCP SYN/ACK packet to the INC 1005 during a step 720.

In response to the TCP SYN/ACK packet, the INC 1005 constructs and transmits a TCP ACK packet to the receiver 1006 during a step 727. The reception of the TCP ACK packet by the receiver 1006 ends the three-way handshake procedure enabling the relay TCP flow to be created between the INC 1005 and the receiver 1006. The relay TCP flow can then be used to communicate between the INC 1005 and the receiver 1006.

When data are transmitted from the source 1001 to the receiver 1006, the INC 1005 extracts the data contained in MTPCP packets of the relayed additional MPTCP subflow and inserts them in TCP packets of the relay TCP flow. Conversely, when data are transmitted from the receiver 1006 to the source 1001, the INC 1005 extracts the data contained in the TCP packets of the relay TCP flow and inserts them in MPTCP packets of the relayed additional MPTCP subflow.

The relayed additional MPTCP subflow is released in a standard fashion as explained in the MPTCP standard. In one embodiment, the release of the relayed additional MPTCP subflow causes the release of the relay TCP flow that is associated with it.

In one embodiment, the second three-way handshake procedure is not implemented. In this embodiment, the relayed additional MPTCP subflow is relayed by an existing TCP flow between the INC 1005 and the receiver 1006, for example using the relay TCP flow created to relay the relayed initial MPTCP subflow of the example described in relation to FIG. 7A. In this case, the closure of the relayed additional MPTCP subflow does not cause the closure of the relay MPTCP flow.

Figure 8:
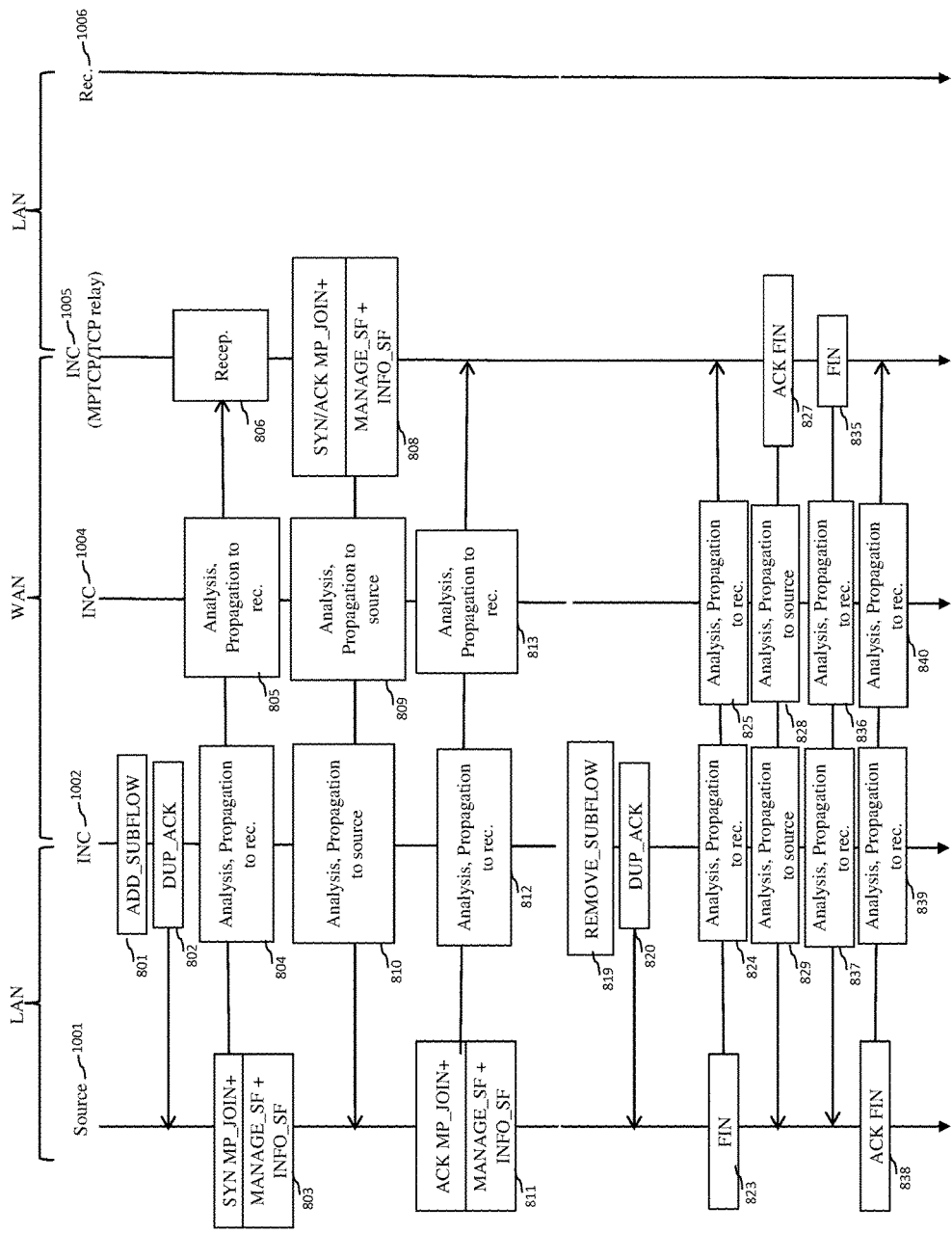
FIG. 8 depicts schematically an example of implementation of a method according to the invention for creating a supplementary MPTCP subflow, following the opening of a new path in a network in which a source able to implement the invention communicates with a TCP receiver, and then of a method according to the invention for deleting said supplementary MPTCP subflow.

FIG. 8 shows schematically an example of implementation of a method according to the invention for creating a supplementary subflow of an MPTCP connection, referred to as the relayed supplementary MPTCP subflow, following the opening of a new path in the network in which a source able to implement the MPTCP+ method communicates with the TCP receiver, and then of a method according to the invention for deleting said relayed supplementary MPTCP subflow. The network described in relation to FIG. 7A is repeated here. In the example in FIG. 8, an intermediate path opens from the INC 1007 in the direction of the receiver 1006.

Following the opening of the intermediate path, a procedure for signalling the opening of a new intermediate path described in relation to steps 801 and 802 is initiated. The relayed supplementary MPTCP subflow must share the source and receiver IP addresses of an existing initial or additional MPTCP subflow. If it is considered for example that the implementation in FIG. 8 follows the implementation in FIG. 7A, the relayed supplementary MPTCP subflow can share the source and receiver IP addresses of the relayed initial MPTCP subflow.

The INC 1002 constructs a header of the ADD_SUBFLOW type during step 801 identical to step 501.

During a step 802 identical to step 502, a header ADD_SUBFLOW is inserted in a plurality of DUP_ACK packets, each DUP_ACK packet being transmitted to the source using different existing MPCTP subflows intended for the source and passing through the INC 1002.

The procedure for signalling the opening of a new intermediate path is followed by a three-way handshake procedure between the source 1001 and the INC 1005. This three-way handshake procedure, described in relation to steps 803 to 806, 808 to 810 and 811 to 813, enables a relayed supplementary MPTCP subflow to be created.

Following the reception of the DUP_ACK packet containing the header ADD_SUBFLOW, the source 1001 creates and sends, during a step 803 identical to step 504, an MPTCP SYN packet containing a header MP_JOIN+ and a header INFO_SUBFLOW. The field Address_Id 1425 of the header MP_JOIN+ of the PTCP SYN packet created during step 803 takes the same address identifier value as the MPTCP SYN packet created during step 701. On the other hand, so as to distinguish the relayed initial MPTCP subflow from the relayed supplementary MPTCP subflow, the source 1001 positions the field SubFlow_Id 1424 at a value different from the one associated with the initial MPTCP subflow, for example the value "1". Moreover, since here it is the INC 1002 that originates the creation of a relayed supplementary MPTCP subflow, a field Seq_Req 1406 is inserted in the header INFO_SUBFLOW. The field Seq_Req 1406 of the header INFO_SUBFLOW takes a random value "AL2".

During steps 804 and 805, the INCs 1002 and 1004 receive, analyse and propagate the MPTCP SYN package in the direction of the receiver 1006. The analyses used during steps 804 and 805 are respectively identical to the analyses used during steps 505 and 507.

During step 804, the INC 1002 determines, by reading the field Seq_Req 1406 of the header INFO_SUBFLOW, that the SYN packet relates to the procedure for creating the relayed supplementary MPTCP subflow which it originates if said field Seq_Req is equal to "AL2". The INC 1002 then knows that it must use the recently opened intermediate path and that the MPTCP SYN packet must be propagated to the receiver 1006 using this intermediate path.

Following the reception of the MPTCP SYN packet during a step 806, the INC 1005 constructs and sends, during a step 808 identical to the step 509 implemented by the receiver 1006, an MPTCP SYN/ACK packet with a header MP_JOIN+ and a header INFO_SUBFLOW. During step 808, the field Addr_Id 1435 of the header MP_JOIN+ of the MPTCP SYN/ACK packet takes the same address-identifier value as the one used in the header MP_JOIN+ of the MPTCP SYN/ACK packet created during step 509. On the other hand, so as to distinguish the relayed initial MPTCP subflow from the relayed supplementary MPTCP subflow, the INC 1005 positions the field SubFlow_Id 1434 at a value different from the one associated with the relayed initial MPTCP subflow by taking for example the value "1".

Steps 809 and 810 are respectively identical to steps 511 and 513.

Steps 811, 812 and 813 are respectively identical to steps 514, 515 and 517. The relayed supplementary MPTCP subflow is opened when the MPTCP ACK packet is received by the INC 1005.

In this example, the relayed supplementary MPTCP subflow is relayed by the relay TCP flow created during steps 704, 705 and 712. When data are transmitted from the source 1001 to the receiver 1006, the INC 1005 extracts the data contained in MPTCP packets of the relayed supplementary MPTCP flow and inserts them in TCP packets of the relay TCP flow. Conversely, when data are transmitted from the receiver 1006 to the source 1001, the INC 1005 extracts the data contained in the TCP packets of the relay TCP flow and inserts them in MPTCP packets of the relayed supplementary MPTCP flow.

When this data packet transfer phase ends, a phase of closure of the relayed supplementary MPTCP subflow is implemented.

The phase of closure of the relayed supplementary MPTCP subflow can be initiated by the source 1001 or the INC 1005. In this case, the closure phase is in every respect identical to a closure phase according to the MPTCP protocol based on an exchange of FIN packets and acknowledgments of receipt of FIN packets.

In one embodiment, the closure phase is initiated by the INC 1002. In this case, the closure phase follows a procedure similar to the procedure described in relation to FIG. 5. This procedure begins with the creation, during a step 819 identical to step 519, of a header of the REMOVE_SUBFLOW subflow type.

The fields SF_Id 1454 and Addr_Id 1455 take values allowing to determine which MPTCP subflow must be closed. In the example in FIG. 8, it is the relayed supplementary MPTCP subflow that must be closed. The fields Sf_Id 1454 and Addr_Id 1455 therefore take respectively the values "1" and "0". The field D 1456 of the header REMOVE_SUBFLOW takes a value indicating that the source 1001 must initiate the closure of the relayed supplementary MPTCP subflow. In this example, the field Port 1458 is not used.

The header REMOVE_SUBFLOW created during step 819 is inserted in at least one DUP_ACK packet intended for the source 1001. In one embodiment, each DUP_ACK packet is transmitted in a different MPTCP subflow intended for the source 1001 passing through the INC 1002.

When the source 1001 receives the packet containing the header REMOVE_SUBFLOW that is intended for it, it initiates a phase of closure of the relayed supplementary MPTCP subflow in every respect identical to a closure phase according to the MPTCP protocol based on an exchange of FIN packets and acknowledgements of receipt of FIN packets.

This phase begins with a sending by the source 1001 of a FIN packet in the direction of the INC 1005 during a step 823. In steps 824 and 825, the INCs 1002 and 1004 analyse and propagate the FIN packet in the direction of the receiver 1006.

The reception of the FIN packet by the INC 1005 causes, during a step 827, the sending of an acknowledgement of receipt of the FIN packet in the direction of the source 1001. During steps 828 and 829, the INCs 1004 and 1002 analyse and propagate the acknowledgment of receipt of the FIN packet in the direction of the source 1001.

A phase of closure of the supplementary subflow initiated by the INC 1005 is next initiated during a step 835. This phase begins with the sending by the INC 1005 of a FIN packet in the direction of the source 1001. During steps 836 and 837, the INCs 1004 and 1002 analyse and propagate the FIN packet in the direction of the source 1001.

The reception of the FIN packet by the source 1001 causes, during a step 838, the sending of an acknowledgement of receipt of the FIN packet in the direction of the INC 1005. During steps 839 and 840, the INCs 1002 and 1004 analyse and propagate the acknowledgement of receipt in the direction of the INC 1005. The relayed supplementary MPTCP subflow is deleted when the acknowledgement of receipt of the FIN packet is received by the INC 1005.

Figure 9:
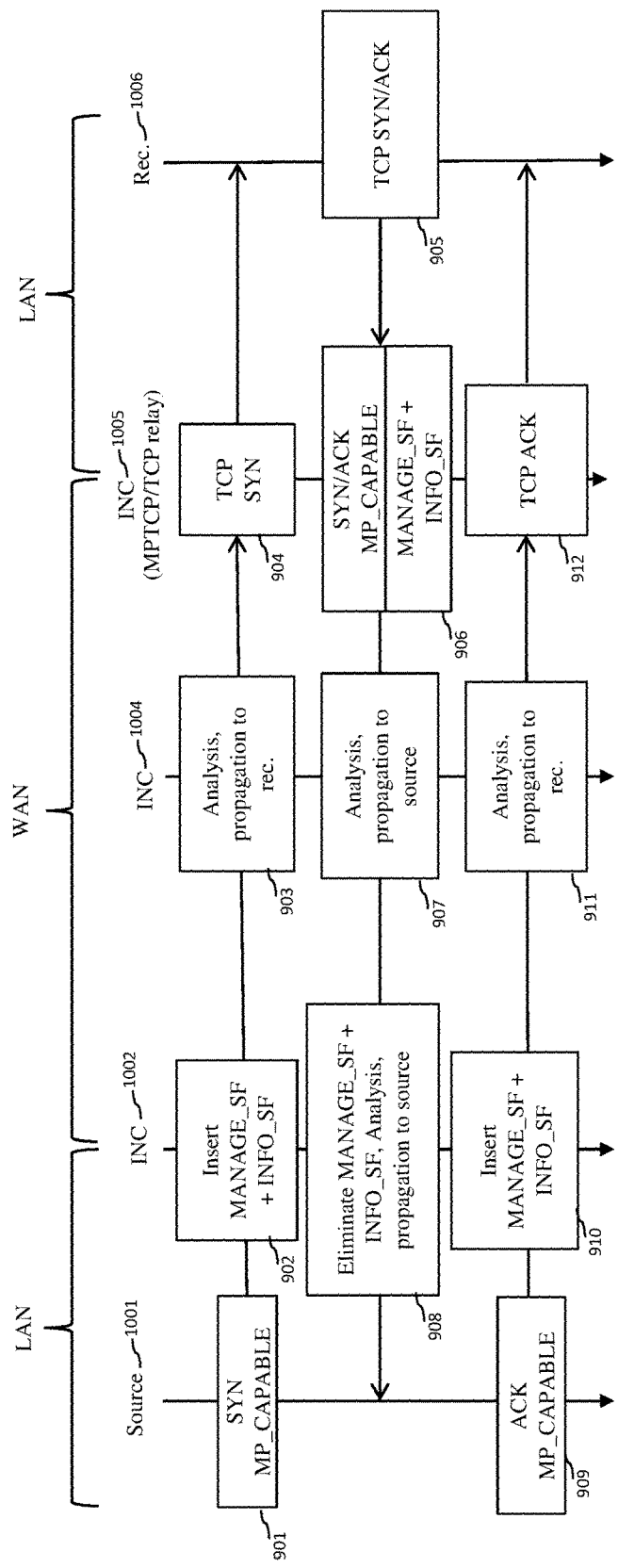
FIG. 9 depicts schematically an example of implementation of a method according to the invention for creating an initial MPTCP subflow in a network in which a source able to implement the MPTCP protocol, but unable to implement the invention, communicates with a TCP receiver by means of at least one INC implementing the invention.

FIG. 9 shows schematically an example of implementation of a method according to the invention for creating an initial subflow of an MPTCP connection in a network in which a source able to implement the MPTCP protocol but unable to implement the MPTCP+ method communicates with a TCP receiver by means of at least one INC implementing the MPTCP+ method. The network described in relation to FIG. 7A is repeated here. The initial MPTCP subflow created is an initial MPTCP subflow relayed by the TCP/MPTCP relay used by the INC 1005. In this example, the source 1001 is able to implement the MPTCP protocol but unable to implement the MPTCP+ method. As described hereinafter, the INC 1002, which for its part is compatible with the MPTCP+ method, is able to compensate for the incompatibility of the source 1001 with the MPTCP+ method.

In addition, in this example, we assume that the source 1001, the receiver 1006 and the INCs 1002 to 1005 are connected together by multiple communication paths. From these communication paths, a plurality of different transmission routes can be formed in order to communicate between the source 1001 and the receiver 1006. To simplify, a transmission route is referred to as a "route" herein after and a communication path is referred to as a "path" hereinafter. Some routes do not involve each INC 1002 to 1005, which may cause uncertainties as to the route that an MPTCP subflow must take. During a three-way handshake procedure for creating an initial, additional or supplementary MPTCP subflow, involving solely network units (source, receiver, INC) compatible with the MPTCP+ method, each network unit can unambiguously determine the paths and routes to be used by the SYN, SYN/ACK and ACK packets. To do this, each network unit can rely on the subflow and address identifiers and the sequence numbers Seq_Req contained in the headers INFO_SUBFLOW and MP_JOIN+ in order to successfully implement the three-way handshake procedure.

On the other hand, a network unit that is not compatible with the MPTCP+ method, such as the source 1001 in the example in FIG. 9, is not capable of handling and using the subflow and address identifiers and the sequence numbers Seq_Req since this information is specific to the MPTCP+ method. If a network unit does not support the MPTCP+ method and has available a plurality of routes, then, if it chooses the wrong route to direct a packet during a three-way handshake procedure, the time delay triggered when a subflow is created by an INC (and detailed above) will allow once again to restart the three-way handshake procedure if one of the packets is lost. This solution may however cause latencies in the creation of an MPTCP subflow.

In the example implementation described in relation to FIG. 9, a specific three-way handshake procedure is used to create an initial MPTCP subflow. The specific three-way handshake procedure allows to control, from end to end, which path is to be used by a network unit, such as the source 1001, the receiver 1006 or the INCs 1002 to 1005, to transmit a packet.

When a procedure for creating an MPTCP subflow (initial, additional or supplementary) is initiated by a source or receiver compatible with the MPTCP protocol but not compatible with the MPTCP+ method, the first INC compatible with the MPTCP+ method receiving the MPTCP SYN packet of the three-way handshake procedure (for example the INC 1002 in the example in FIG. 9) defines a first set of local port numbers, such as a range of port numbers, and inserts a header INFO_SUBFLOW comprising information representing said first set of local port numbers in the MPTCP SYN packet. This first set of local port numbers corresponds to a set of port numbers that can be allocated by the first INC for communicating in the context of MPTCP subflow.

According to a method that we detail hereinafter, each network unit through which the MPTCP SYN packet passes defines a second set of local port numbers dependent on the first set of local port numbers and inserts information representing this second set of local port numbers in the header INFO_SUBFLOW of the SYN packet. A network unit through which the MPTCP SYN packet passes is an INC other than the first INC (for example the INC 1004 of the example in FIG. 9). Each second set of local port numbers defined by a network unit corresponds to a set of port numbers that can be allocated by said network unit for communicating in the context of an MPTCP subflow. The specific three-way handshake procedure uses an adapted SYN packet header INFO_SUBFLOW, referred to as an adapted header INFO_SUBFLOW. The adapted header INFO_SUBFLOW is described in relation to FIG. 14H. The adapted header INFO_SUBFLOW allows to specify a range of port numbers. Fields 1470, 1471 and 1472, called respectively Kind, Length and SubType, of a conventional MPTCP header are found in the adapted header INFO_SUBFLOW. The adapted header INFO_SUBFLOW also comprises a field 1473, called SubSubT, coded for example in four bits, taking a specific value allowing to identify the adapted header INFO_SUBFLOW. The field SubSubT 1473 is followed by a reserved field 1474, called Reserved, coded for example in four bits, and a field 1475, called Addr_Id, coded for example in four bits, allowing to identify an IP address of a network unit originating an opening of an MPTCP subflow. The header INFO_SUBFLOW also comprises fields 1476 and 1477, called respectively Port_first and Port_last, coded for example in sixteen bits, representing a range of port numbers.

In a step 901, the source 1001 creates and sends an MPTCP SYN packet with a conventional header MP_CAPABLE.

In a step 902, the INC 1002 receives the MPTCP SYN packet created during step 902. Since the MPTCP SYN packet received does not contain a header INFO_SUBFLOW, the INC 1002 saves in memory information representing the fact that the source 1001 is not compatible with the MPTCP+ method. Moreover, the INC 1002 saves in memory information representing the fact that it is the first INC compatible with the MPTCP+ method on a route leading from the source 1001 to the INC 1006.

In addition, during step 902, the INC 1002 allocates a range of port numbers allowing to identify paths to be used for communicating with the receiver 1006. The port numbers of said range can allow to identify existing paths, or serve to identify future paths that could open from the INC 1002. Each path is associated with a subpart of the allocated range of port numbers. For example, the INC 1002 may allocate a range of port numbers ranging from the value "80" to the value "5080" with five paths, two existing paths comprising a path used for transmitting the MPTCP SYN packet in the direction of the receiver 1006 and three hypothetical paths that could open in the future. Said range is next divided into five subparts. A first subpart ranging from the value "80" to the value "1079" is associated with the path used for transmitting the MPTCP SYN packet in the direction of the receiver 1006. A second subpart ranging from the value "1080" to the value "2079" is associated with the second existing path. Three other subparts are allocated for the hypothetical paths.

Figure 14H:
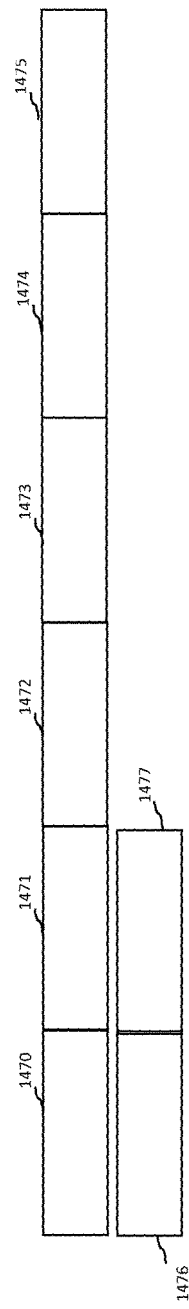
FIG. 14H shows schematically an SYN packet header of the MANAGE_SUBFLOW type comprising a subheader of the INFO_SUBFLOW type according to a second embodiment of the invention.
Figure 14I:
FIG. 14I shows schematically a header of the REMOVE_ADDR type according to the invention.

The INC 1002 next inserts an adapted header INFO_SUBFLOW as described in relation to FIG. 14H in the MPTCP SYN packet. During step 902, the field Addr_Id 1475 of the adapted header INFO_SUBFLOW takes a value allowing to identify an IP address of the source 1001 used for transmitting the MPTCP SYN packet, for example the field Addr_Id 1475 takes the value "0". The field Port_first 1475 takes the minimum value of the subpart of the range of port numbers allocated by the INC 1002 corresponding to the path used for transmitting the MPTCP SYN packet in the direction of the receiver 1006. The field Port_last 1477 takes the maximum value of the subpart of the range of port numbers allocated by the INC 1002 corresponding to the path used for transmitting the MPTCP SYN packet in the direction of the receiver 1006. Taking again the example of the range of port numbers ranging from the value "80" to the value "5080", the field Port_first 1476 takes the value "80" and the field Port_last 1477 takes the value "1079".

During a step 903, the INC 1004 receives the MPTCP SYN packet comprising the adapted header INFO_SUBFLOW introduced by the INC 1002. The INC 1004 saves the range of port numbers indicated in the header INFO_SUBFLOW by the fields Port_first 1475 and Port_last 1477. The range saved by the INC 1004 is divided into subparts, each subpart corresponding to an existing or hypothetical path allowing to communicate with the receiver 1006. As in the case of the INC 1002, the INC 1004 can divide the range into five subparts, two subparts corresponding to existing paths comprising a path used for transmitting the MPTCP SYN packet to the INC 1005 and three hypothetical paths. The INC 1004 modifies the fields Port_first 1476 and Port_last 1477 of the MPTCP SYN packet to indicate the subpart of the range of port numbers used for transmitting the MPTCP SYN packet. Taking again the example of the range of port numbers ranging from the value "80" to the value "5080", the field Port_first 1476 remains unchanged and the field Port_last 1477 takes the value "279". The MPTCP SYN packet thus modified is next transmitted in the direction of the receiver 1006.

In a step 904, the INC 1005 receives the MPTCP SYN packet. In a step 906, the INC 1005 constructs and sends an MPTCP SYN/ACK packet with a header MP_CAPABLE and a header INFO_SUBFLOW in the direction of the source 1001. The header INFO_SUBFLOW is the one described in relation to FIG. 14B. The fields of the header INFO_SUBFLOW created during step 906 are identical to the corresponding fields of the header INFO_SUBFLOW created during step 706.

When the MPTCP SYN/ACK packet is received, the INC 1004 implements a step 907 similar to step 707.

In a step 908, the INC 1002 receives the MPTCP SYN/ACK packet. By consulting the header INFO_SUBFLOW as well as the information saved in memory during step 902, the INC 1002 deduces from this that this packet is intended for the source 1001, which is not compatible with the MPCTP+ method. In order to supply an SYN/ACK packet suited to the source 1001, the INC 1002 deletes the header INFO_SUBFLOW from the MPTCP SYN/ACK packet. The SYN/ACK packet thus modified is sent to the source 1001.

It should be noted that, in one implementation of step 908, the INC 1002 does not delete the header INFO_SUBFLOW. In this case, the header INFO_SUBFLOW is ignored by the source 1001.

In response to the MPTCP SYN/ACK packet, the source 1001 constructs and sends, during a step 909, an MPTCP ACK packet with a header MP_CAPABLE.

During a step 910, the INC 1002 receives the MPTCP ACK packet and inserts a header INFO_SUBFLOW in the MPTCP ACK packet. The header INFO_SUBFLOW is the one described in relation to 14B.

During a step 911, similar to step 711, the INC 1004 receives the MPTCP ACK packet.

The reception of the MPTCP ACK packet by the INC 1005 ends the three-way handshake procedure for creating the relayed initial MPTCP subflow. Said relayed initial MPTCP subflow uses: between the source 1001 and the INC 1002, the path used during step 901 for sending the MPTCP SYN packet without the MANAGE_SUBFLOW header; between the INC 1002 and the INC 1004, the path used during step 902 for sending the MPTCP SYN packet comprising the adapted header INFO_SUBFLOW comprising information representing a first range of port numbers; and between the INC 1004 and the INC 1005 the path used during step 903 for retransmitting the MPTCP SYN packet comprising the adapted header INFO_SUBFLOW in which the information representing the range of port numbers was modified.

The reception of the MPTCP SYN packet by the INC 1005 during step 904 causes the triggering of a three-way handshake procedure for creating a relay TCP flow comprising steps 904, 905 and 912 identical to steps 705, 705 and 712.

The release of the relayed initial MPTCP subflow is done in a standard fashion, as explained in the MPTCP standard, using the paths corresponding to the relayed initial MPTCP subflow. In one embodiment, the release of the relayed initial MPTCP subflow causes the release of the relay TCP flow. The release of the relay TCP flow is done in a standard fashion, as explained in the TCP standard.

Figure 10:
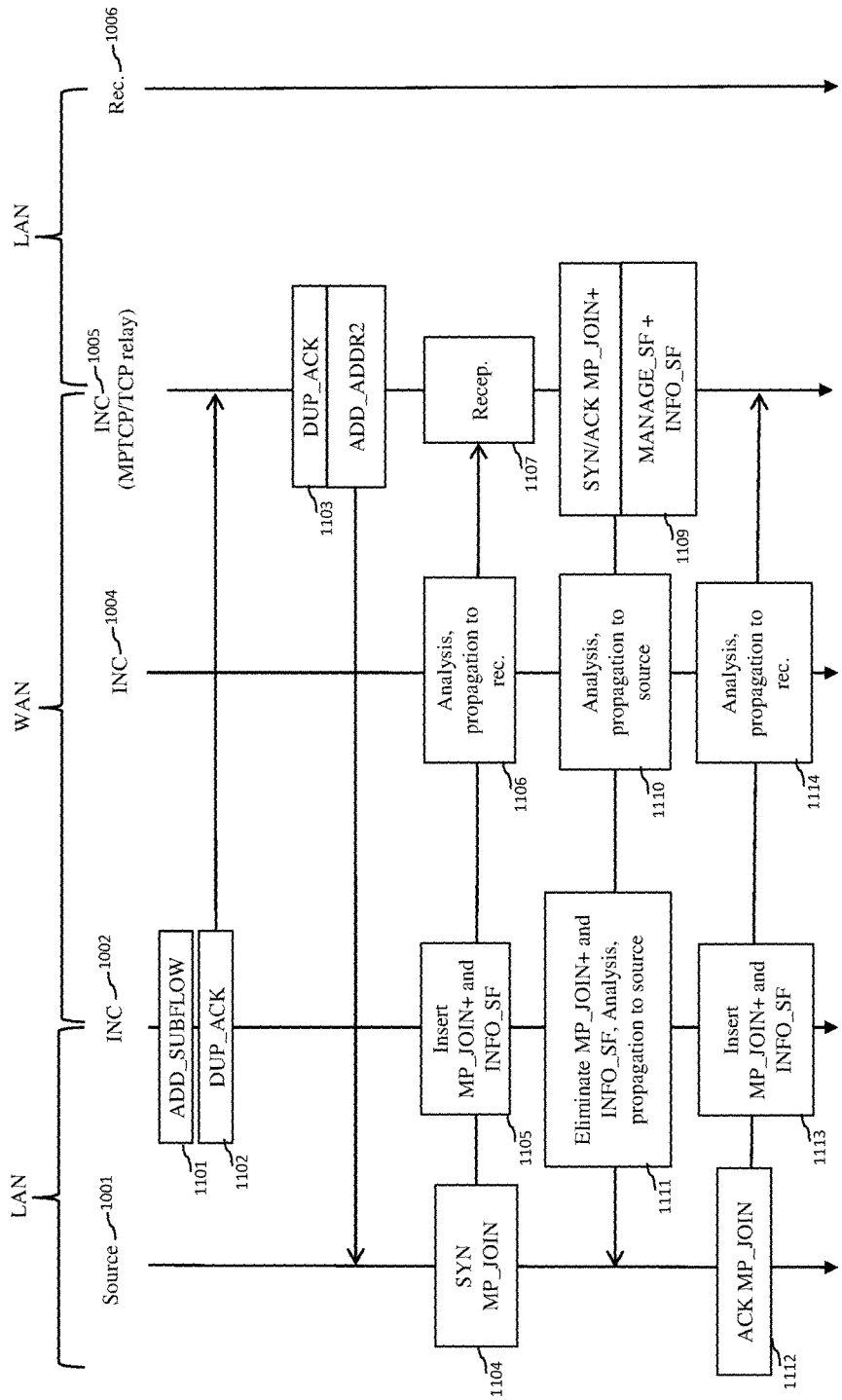
FIG. 10 depicts schematically an example of implementation of a method according to the invention for creating a supplementary MPTCP subflow following the opening of a new intermediate path in a network in which a source able to implement the MPTCP protocol but unable to implement the invention communicates with a TCP receiver by means of at least one INC implementing the invention.

FIG. 10 depicts schematically an example of implementation of a method according to the invention for creating a supplementary subflow of an MPTCP connection following an opening of a new path in a network in which a source able to implement the MPTCP protocol but unable to implement the invention communicates with a TCP receiver by means of at least one INC implementing the invention. We repeat here the network described in relation to FIG. 7A and assume that the example implementation of FIG. 10 follows the creation of a relayed initial MPTCP subflow described in relation to FIG. 9. The supplementary subflow created in the example in FIG. 10 is therefore a relayed supplementary MPTCP subflow sharing the source and receiver IP addresses of the relayed initial MPTCP subflow created in the example embodiment described in relation to FIG. 9.

In the example in FIG. 10, an intermediate path opens from the INC 1002 and in the direction of the receiver 1006.

Following the opening of the intermediate path, a procedure of signalling an opening of a new intermediate path described in relation to steps 1101 and 1102 is initiated. The INC 1002 constructs a header of the ADD_SUBFLOW type during step 1101. The header ADD_SUBFLOW constructed during step 1101 differs from the header ADD_SUBFLOW constructed during step 801 only through the presence of the optional field Port. The port number is included in a subpart of the range of port numbers corresponding to a path that can be used for the relayed supplementary MPTCP subflow defined at step 902. For example, if a subpart of the range of port numbers lying between the value "2080" and the value "3079" corresponds to an unused path, the port number takes the value "2080".

During a step 1102, the INC 1002 determines to whom DUP_ACK packets containing the header ADD_SUBFLOW should be transmitted. It is necessary in fact to transmit these packets to a destination capable of responding to these packets. In other words, it is necessary for the destination to be compatible with the MPTCP+ method. In the network used in the example described in relation to FIG. 10, the source 1001 and the receiver 1006 are not compatible with the MPTCP+ method. Only the INC 1005 is compatible with the MPTCP+ method since it fulfils a role of TCP/MPTCP relay compatible with the MPTCP method. The header ADD_SUBFLOW constructed during step 1101 is inserted, for example, in a plurality of DUP_ACK packets, each DUP_ACK packet being transmitted to the INC 1005 using different existing MPTCP subflows intended for the INC 1005 and passing through the INC 1002.

Following the reception of at least one of said DUP_ACK packets containing the header ADD_SUBFLOW, the INC 1005 creates and sends to the source 1001, in a step 1103, similar to step 605, at least one packet of the DUP_ACK type containing a header of the ADD_ADDR2 type as described in relation to FIG. 14G. The fields Addr_Id 1465 and Address_IP 1466 of the header ADD_ADDR2 take respectively the value "0", corresponding to the address identifier used in the field Addr_Id 1475 and the header INFO_SUBFLOW when the MPTCP SYN packet is transmitted during step 902, and an IP address corresponding to this identifier. The use of the address identifier used in the field Addr_Id 1475 during step 902 allows to indicate to the source 1001 that the relayed supplementary MPTCP subflow to be created is a supplementary subflow of the relayed initial MPTCP subflow created in the example embodiment described in relation to FIG. 9. Moreover, the INC 1005 inserts an optional field Port 1467 in the header ADD_ADDR2 and gives to the field Port 1467 of the header ADD_ADDR2 the value of the field Port 1448 of the header ADD_SUBFLOW (i.e. the port having the port number "2080").

The procedure for signalling the opening of a new intermediate path is followed by a three-way handshake procedure between the source 1001 and the INC 1005. This three-way handshake procedure, described in relation to steps 1104 to 1107, 1109 to 1111 and 1112 to 1114, enables the relayed supplementary MPTCP subflow using the new path to be created. This three-way handshake procedure is a specific three-way handshake procedure.

Following the reception of at least one of the DUP_ACK packets containing the header ADD_ADDR2, the source 1001 creates and sends, during a step 1104, an MPTCP SYN packet containing a conventional header MP_JOIN, as described in the MPTCP standard. The SYN packet containing the header MP_JOIN is transmitted to a destination port of the INC 1002 the port number which corresponds to the port number indicated in the field Port of the header ADD_ADDR2 received by the source 1001 (i.e. the port having the port number "2080").

During a step 1105, the INC 1002 receives the MPTCP SYN packet containing the header MP_JOIN on a destination port corresponding to the port number indicated in the header ADD_ADDR2 (i.e. the port having the port number "2080". The reception on this destination port enables the INC 1002 to determine that an MPTCP SYN packet relating to the relayed supplementary MPTCP subflow the creation of which it initiated is present. The INC 1002 then constructs an adapted header INFO_SUBFLOW and a header MP_JOIN+. The field Address_Id 1425 of the header MP_JOIN+ takes the same address identifier value as the field Addr_Id 1405 of the adapted header INFO_SUBFLOW of the MPTCP SYN packet created during step 902. The field Subflow_Id 1424 of the header MP_JOIN+ is not used and takes any value, for example the value "0". This is because, in this example, the use of the field Subflow_Id 1424 is no longer necessary for identifying a subflow since a subflow can be identified from information representing port numbers. A set of local port numbers dependent on the port number indicated in the header ADD_ADDR2 is defined and saved in memory by the INC 1002. The field Port_first 1476 takes a port number value belonging to the same subpart of the range of port number values as the value of the port number indicated in the header ADD_ADDR2. For example, the field Port_first 1476 takes the value of the port number indicated in the header ADD_ADDR2. The field Port_last 1477 takes a port number value included in the same subpart of the range of port numbers as the port number indicated in the packet ADD_ADDR2. For example, if the field Port_first 1476 takes the value "2080" indicated in the header ADD_ADDR2, the field Port_last 1477 takes the value "3079". The headers MP_JOIN+ and INFO_SUBFLOW thus created are used to place the header MP_JOIN in the MPTCP SYN packet received during step 1105. The MPTCP SYN packet thus modified is then transmitted in the direction of the receiver 1006 using the new path.

During a step 1106, the INC 1004 receives the MPTCP SYN packet containing the header MP_JOIN+ and the header INFO_SUBFLOW. The reception of the MPTCP SYN packet indicates to the INC 1004 that a phase of creating a relayed supplementary MPTCP subflow is under way. The INC 1004 defines a set of local port numbers included in the range of port numbers indicated by the fields Port_first 1476 and Port_last 1477 of the MPTCP SYN packet. Subsequently, the INC 1004 replaces the values of the fields Port_first 1476 and Port_last 1477 of the MPTCP SYN packet with values representing the set of local port numbers defined by the INC 1004. For example, if the range of port numbers received by the INC 1004 lies between the value "2080" and the value "3079", the INC 1004 can fix the value of the field Port_first 1476 at "2080" and the value of the field Port_last 1477 at "2279". The MPTCP SYN packet thus modified is next transmitted in the direction of the receiver 1006.

In a step 1107, the INC 1005 receives the MPTCP SYN packet.

In a step 1109, the INC 1005 constructs and sends an MPTCP SYN/ACK packet with a header MP_JOIN+ and a header INFO_SUBFLOW in the direction of the source 1001. The field Subflow_Id 1434 of the header MP_JOIN+ is not used and takes any value, for example the value "0". The field TypeOfLink 1414 and the fields A 1415 and B 1416 of the header INFO_SUBFLOW give respectively indications on the new path, and indications on an encryption algorithm used.

When the MPTCP SYN/ACK packet is received, the INC 1004 implements a step 1110 similar to step 907.

During a step 1111, the INC 1002 receives the MPTCP SYN/ACK packet. By consulting the header INFO_SUBFLOW and the information saved in memory at steps 902 and 1105, the INC 1002 knows that this packet must be transmitted to the source 1001, which is not compatible with the MPTCP+ method. Consequently, during step 1111, the INC 1002 deletes the headers MP_JOIN+ and INFO_SUBFLOW of the MPTCP SYN/ACK packet and replaces them with a conventional header MP_JOIN. The INC 1002 next transmits the MPTCP SYN/ACK packet thus modified to the source 1001.

It should be noted that, in the implementation of step 1111, the INC 1002 does not replace the headers MP_JOIN+ and INFO_SUBFLOW with a header MP_JOIN. In this case, the headers and fields relating to the MPTCP+ method are ignored by the source 1001.

In a step 1112, in response to the reception of the MPTCP SYN/ACK packet, the source 1001 transmits an MPTCP ACK packet with a conventional header MP_JOIN to a destination port of the INC 1002 the port number of which is indicated in the field Port of the header ADD_ADDR2 received by the source 1001.

In a step 1113, when the MPTCP ACK packet is received on the destination port the port number of which is indicated in the field Port 1467 of the header ADD_ADDR2, the INC 1002 knows that an MPTCP ACK packet relating to the relayed supplementary MPTCP subflow that it originated is present. During step 1113, a header MP_JOIN+ and a header INFO_SUBFLOW are constructed by the INC 1002. The fields TypeOfLink 1414, A 1415 and B 1416 are copied from corresponding fields of the MPTCP SYN/ACK packet received during step 1111. The header MP_JOIN of the MPTCP ACK packet is next replaced by the headers MP_JOIN+ and INFO_SUBFLOW. The MPTCP ACK packet thus modified is transmitted in the direction of the receiver 1006 using the new path.

In a step 1114, the INC 1004 receives the MPTCP ACK packet. The MPTCP ACK packet is next retransmitted to the INC 1005, which ends the three-way handshake procedure.

The relayed supplementary MPTCP subflow thus created is relayed by an existing TCP flow, such as for example the relay TCP flow created during steps 904, 905 and 912.

Figure 11:
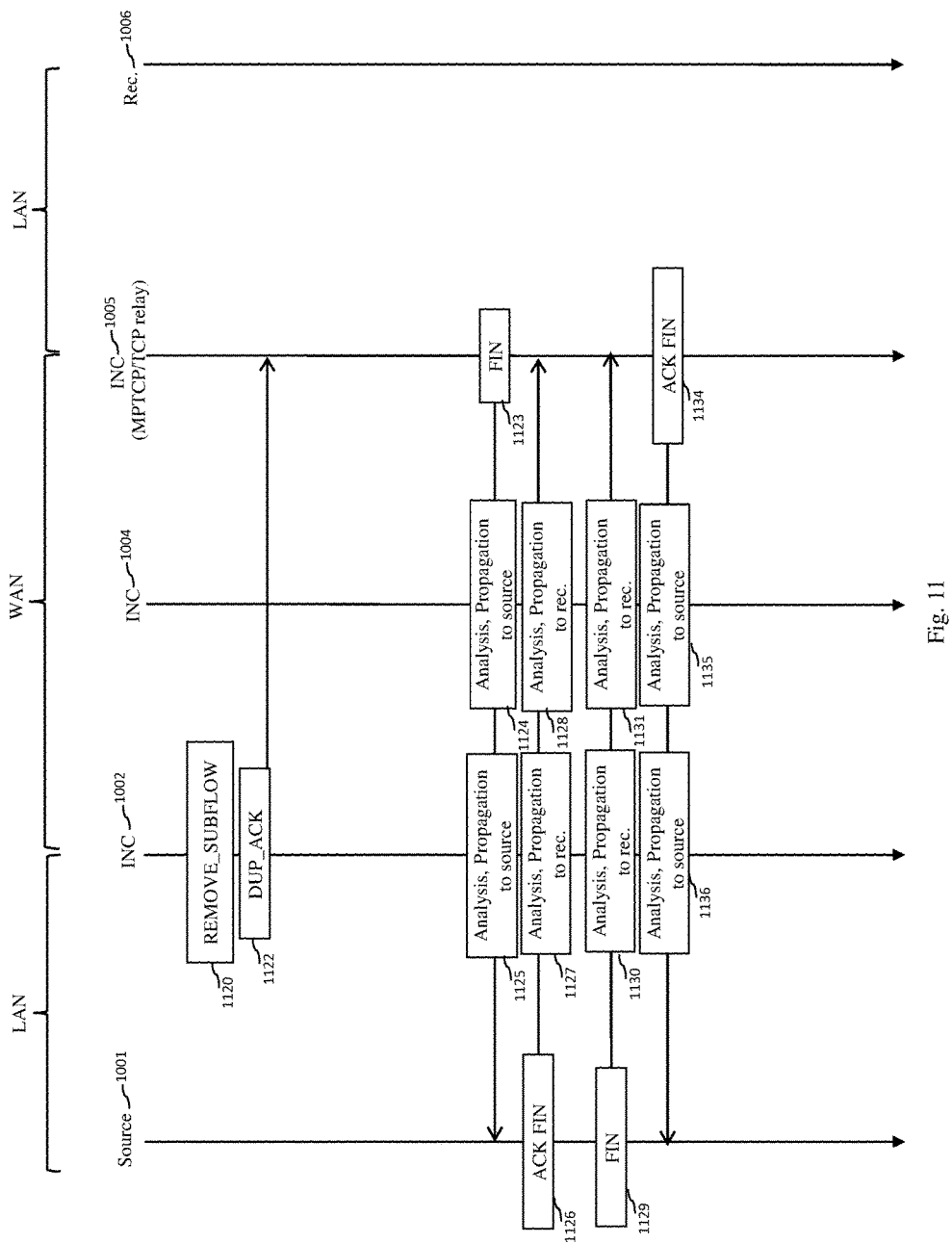
FIG. 11 depicts schematically an example of implementation of a method for deleting the supplementary MPTCP subflow, the method being initiated by an INC, in a network in which a source able to implement the MPTCP protocol but unable to implement the invention communicates with a TCP receiver by means of at least one INC implementing the invention.

FIG. 11 shows schematically an example of implementation of a method for deleting the supplementary subflow of an MPTCP connection initiated by an INC in a network in which a source able to implement the MPTCP protocol but unable to implement the MPTCP+ method communicates with a TCP receiver by means of at least one INC implementing the MPTCP+ method. We repeat here the network described in relation to FIG. 7 and assume that the example implementation in FIG. 11 follows the creation of a relayed supplementary MPTCP subflow described in relation to FIG. 10.

In the example described in relation to FIG. 11, the closure phase is initiated by the INC originating the request to create the supplementary subflow, i.e. by the INC 1002. In this case, the closure phase follows a procedure similar to the procedure specific to the MPTCP+ method described in relation to steps 519 to 521 and 524 to 543 in FIG. 5. This procedure begins with the creation, during a step 1120, of a header of the REMOVE_SUBFLOW type.

The field SF_Id 1454 of each header REMOVE_SUB-FLOW takes a default value, for example "0". This is because, in the example in FIG. 11, the identification of the MPTCP subflow to be deleted uses the port number used by the INC 1002 for transmitting the relayed supplementary MPTCP subflow rather than the value of the field SF_Id 1454.

The field Addr_Id 1455 of the header REMOVE_SUB-FLOW takes the same value as the field Addr_Id 1445 of the header ADD_SUBFLOW constructed by the INC 1002 during step 1101.

The field D of the header REMOVE_SUBFLOW takes a value indicating to the source 1001 that it must initiate a procedure of closing the relayed supplementary MPTCP subflow. In this example, the field Port 1458 takes the value of the port used by the INC 1002 to transmit the relayed supplementary MPTCP subflow, used for example during step 1110.

The header REMOVE_SUBFLOW created during step 1120 is inserted, in a step 1122, in at least one DUP_ACK packet passing through the INC 1002 and intended for the INC 1005, the INC 1005 being the only entity in the network in FIG. 11 to be able to respond to a packet containing the header REMOVE_SUBFLOW. In one embodiment, each DUP_ACK packet is transmitted in a different MPTCP subflow intended for the source 1001 passing through the INC 1002.

When the INC 1005 receives the DUP_ACK packet containing the header REMOVE_SUBFLOW, the INC 1005 initiates a phase of closing the supplementary MPTCP subflow. This phase begins, in a step 1123, with the sending, by the INC 1005, of an FIN packet in the direction of the INC 1002. The INC 1005 uses the port number indicated in the field port 1458 of the header REMOVE_SUBFLOW to identify the MPTCP subflow to be deleted.

In a step 1124, the INC 1004 analyses and propagates the FIN packet in the direction of the INC 1002.

In a step 1125, the INC 1002 receives the FIN packet on the port indicated by the field port 1458 of the header REMOVE_SUBFLOW. Reception of the FIN packet on this port indicates to the INC 1002 that a phase of deletion of the relayed supplementary MPTCP subflow the creation of which it initiated is under way.

During a step 1126, in response to the reception of a FIN packet coming from the INC 1002, the source 1001 sends an acknowledgement of receipt of the FIN packet on the port of the INC 1002 indicated in the field port 1458 of the header REMOVE_SUBFLOW.

During a step 1127, the INC 1002 receives the acknowledgement of receipt of the FIN packet on the port of the INC 1002 indicated in the field port 1458 of the header REMOVE_SUBFLOW and retransmits this packet to the INC 1004.

In a step 1128, the INC 1004 receives the acknowledgement of receipt of the FIN packet and retransmits it to the INC 1005. Step 1128 ends the procedure of deletion of the relayed supplementary MPTCP subflow at the INC 1005.

A phase of closure of the relayed supplementary MPTCP subflow is next initiated by the source 1001. This phase begins, during a step 1129, with a sending by the source 1001 of an FIN packet in the direction of the INC 1005.

In a step 1130, the INC 1002 receives the FIN packet and retransmits it to the INC 1004. In a step 1131, the INC 1004 receives the FIN packet and retransmits it to the INC 1005.

During a step 1134, in response to the reception of the FIN packet, the INC 1005 sends an acknowledgement of receipt of the FIN packet in the direction of the INC 1002.

During a step 1135, the INC 1004 receives the acknowledgement of receipt of the FIN packet and retransmits it to the INC 1002.

During a step 1136, the INC 1002 receives the acknowledgement of receipt of the FIN packet indicating to the INC 1002 that the phase of deletion of the relayed supplementary MPTCP subflow is ending. In addition, the INC 1002 knows that it must transmit an acknowledgement of receipt of the FIN packet to the source 1001.

The reception of the acknowledgement of receipt of the FIN packet by the source 1001 ends the procedure of deletion of the relayed supplementary MPTCP subflow.

Figure 12A:
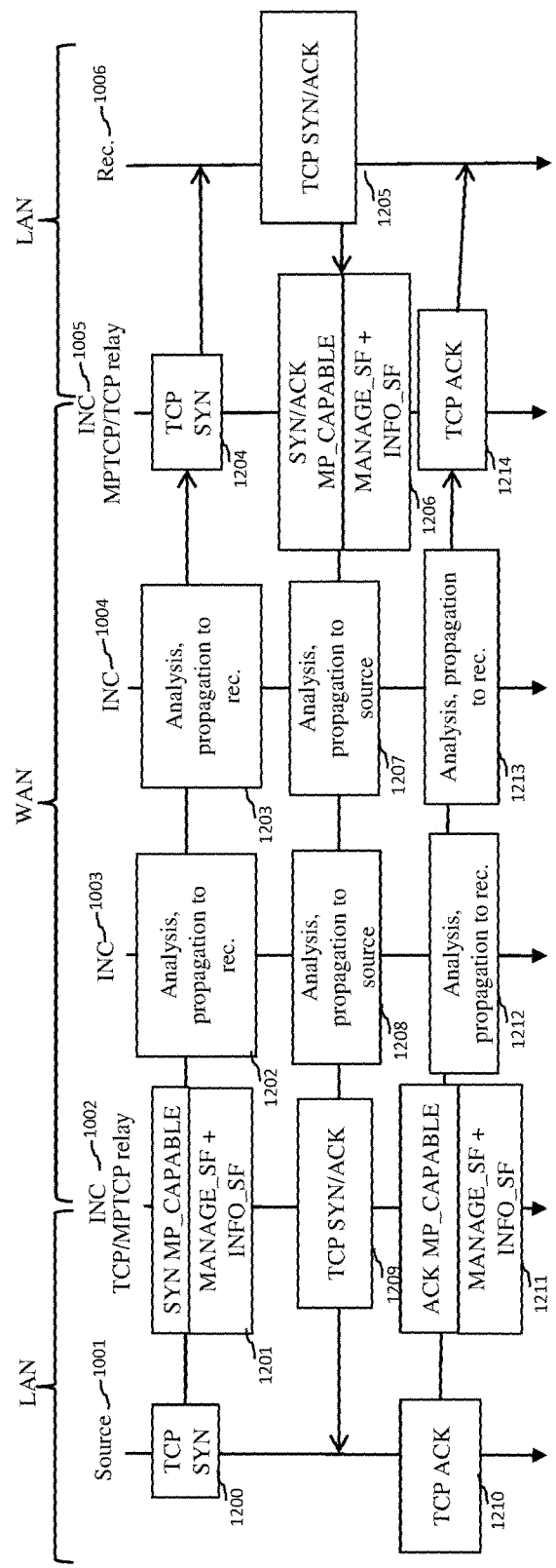
FIG. 12A depicts schematically an example of implementation of a method according to the invention for creating an initial MPTCP subflow in a network in which a TCP source communicates with a TCP receiver by means of an INC implementing the invention, two of the INCs implementing the invention being TCP/MPTCP relays.

FIG. 12A shows schematically an example of implementation of a method according to the invention for creating an initial MPTCP subflow in a network in which a TCP source communicates with the TCP receiver by means of an INC implementing the MPTCP+ method, two of the INCs implementing the MPTCP+ method being TCP/MPTCP relays.

We reuse, in the example described in relation to FIG. 12A, the network described in relation to FIG. 1. However, in the example of FIG. 12A, the source 1001 and the receiver 1006 are incompatible with the MPTCP protocol and the MPTCP+ method and communicate using the TCP protocol. The INCs 1002 and 1005 are TCP/MPTCP relays and are compatible with the MPTCP+ method.

Moreover, we assume here that only one route exists between the source 1001 and the receiver 1006, so that there is never any ambiguity on the paths to be used by a network unit. The header INFO_SUBFLOW of the SYN packet used in this example is therefore the one described in relation to FIG. 14A.

In a step 1200, the source 1001 starts a first three-way handshake procedure in order to create a TCP flow between the source 1001 and the INC 1002. For this purpose, the source 1001 sends a TCP SYN packet to the INC 1002. In a step 1209, the INC 1002 sends a TCP SYN/ACK packet to the source 1001. The first three-way handshake procedure creating a TCP flow between the source 1001 and the INC 1002 ends with a step 1210, during which the source 1001 sends a TCP ACK packet to the INC 1002. The TCP flow thus created is a relay TCP flow since, as described hereinafter, it allows to relay data issuing from an MPTCP subflow between the source 1001 and the INC 1002. The relay TCP flow created between the source 1001 and the INC 1002 is referred to as a source relay TCP flow.

Following the reception of the TCP SYN packet sent during step 1200 by the source 1001, the INC 1002 initiates a second three-way handshake procedure in order to create an initial MPTCP subflow. This initial MPTCP subflow uses, for example, the same sextuplet as the one used in the creation of an initial MPTCP subflow described in relation to FIG. 4 by steps 401 to 415. In the case of the example described in relation to FIG. 12A, the initial MPTCP subflow is an initial MPTCP subflow relayed firstly by the source relay TCP flow and, as described hereinafter, by a relay TCP flow between the INC 1005 and the receiver 1006, which we refer to as a receiver relay TCP flow. This second three-way handshake procedure begins in a step 1201 with the creation and sending of an MPTCP SYN packet with a header MP_CAPABLE and a header INFO_SUBFLOW. In the example in FIG. 12A, the INC 1002 behaves like a source from the point of view of the MPTCP connection. The headers MP_CAPABLE and INFO_SUBFLOW are therefore identical to the headers MP_CAPABLE and INFO_SUBFLOW constructed by the source 1001 during step 401.

Moreover, during step 1201, the INC 1002 makes the association between the source relay MPTCP flow and the relayed initial MPTCP flow being created. By making this association, the INC 1002 ensures that each TCP packet received by the INC 1002 is switched to the relayed initial MPTCP subflow and that each MPTCP packet received by the INC 1002 is switched to the source relay TCP flow.

Once created, the MPTCP SYN packet containing the headers MP_CAPABLE and INFO_SUBFLOW is sent in the direction of the receiver 1006.

In a step 1202 identical to step 403, the INC 1003 receives the MPTCP SYN packet containing the headers MP_CAPABLE and INFO_SUBFLOW and retransmits them in the direction of the receiver 1006. In a step 1203 identical to step 404, the INC 1004 receives the MPTCP SYN packet containing the headers MP_CAPABLE and INFO_SUBFLOW and retransmits it in the direction of the receiver 1006.

In a step 1204, the INC 1005 receives the MPTCP SYN packet containing the headers MP_CAPABLE and INFO_SUBFLOW and determines that this packet is intended for the receiver 1006. The INC 1005 then uses the third three-way handshake procedure to create the receiver relay TCP flow. This procedure comprises a sending of a TCP SYN packet to the receiver 1006 during a step 1204, a sending of a TCP SYN/ACK packet by the receiver 1006 during a step 1205 in response to the TCP SYN packet, and a sending of an acknowledgement of receipt of the TCP SYN/ACK packet by the INC 1005 during a step 1214. In the same way as the INC 1002 had made the association between the source relay TCP flow and the relayed initial MPTCP subflow, during step 1204 the INC 1005 makes the association between the receiver relay TCP flow and the relayed initial MPTCP subflow. By making this association, the INC 1005 ensures that each TCP packet received by the INC 1005 is switched to the relayed initial MPTCP subflow and that each MPTCP packet received by the INC 1005 is switched to the receiver relay TCP flow.

During a step 1206, following the reception of the MPTCP SYN packet containing the headers MP_CAPABLE and INFO_SUBFLOW, the INC 1005 constructs an MPTCP SYN/ACK packet containing a header MP_CAPABLE and a header INFO_SUBFLOW. In the example described in relation to FIG. 12A, the INC 1005 behaves like a receiver. The headers MP_CAPABLE and INFO_SUBFLOW are therefore identical to the headers MP_CAPABLE and INFO_SUBFLOW constructed by the receiver 1006 during step 406.

Once created, the MPTCP SYN/ACK packet containing the headers MP_CAPABLE and INFO_SUBFLOW is sent in the direction of the source 1001.

In a step 1207 identical to step 408, the INC 1004 receives the MPTCP SYN/ACK packet containing the headers MP_CAPABLE and INFO_SUBFLOW and retransmits it in the direction of the source 1001. In a step 1208 identical to step 409, the INC 1003 receives the MPTCP SYN/ACK packet containing the headers MP_CAPABLE and INFO_SUBFLOW and retransmits it in the direction of the source 1001.

In a step 1211, following the reception of the MPTCP SYN/ACK packet containing the headers MP_CAPABLE and INFO_SUBFLOW, the INC 1002 constructs an MPTCP ACK packet containing a header MP_CAPABLE and a header INFO_SUBFLOW identical respectively to the header MP_CAPABLE and the header INFO_SUBFLOW constructed during step 411.

In a step 1212 identical to step 413, the INC 1003 receives the MPTCP ACK packet containing the headers MP_CAPABLE and INFO_SUBFLOW and retransmits it in the direction of the receiver 1006. In a step 1203 identical to step 404, the INC 1004 receives the MPTCP ACK packet containing the headers MP_CAPABLE and INFO_SUBFLOW and retransmits it in the direction of the receiver 1006.

The three-way handshake procedure allowing the creation of the relayed initial MPTCP subflow ends at the reception by the INC 1005 of the MPTCP ACK packet containing the headers MP_CAPABLE and INFO_SUBFLOW.

The source 1001 and receiver 1006 can then communicate using the source relay TCP flow between the source 1001 and the INC 1002, the relayed initial MPTCP subflow between the INC 1002 and the INC 1005 and the receiver relay TCP flow between the INC 1005 and the receiver 1006.

Figure 12B:
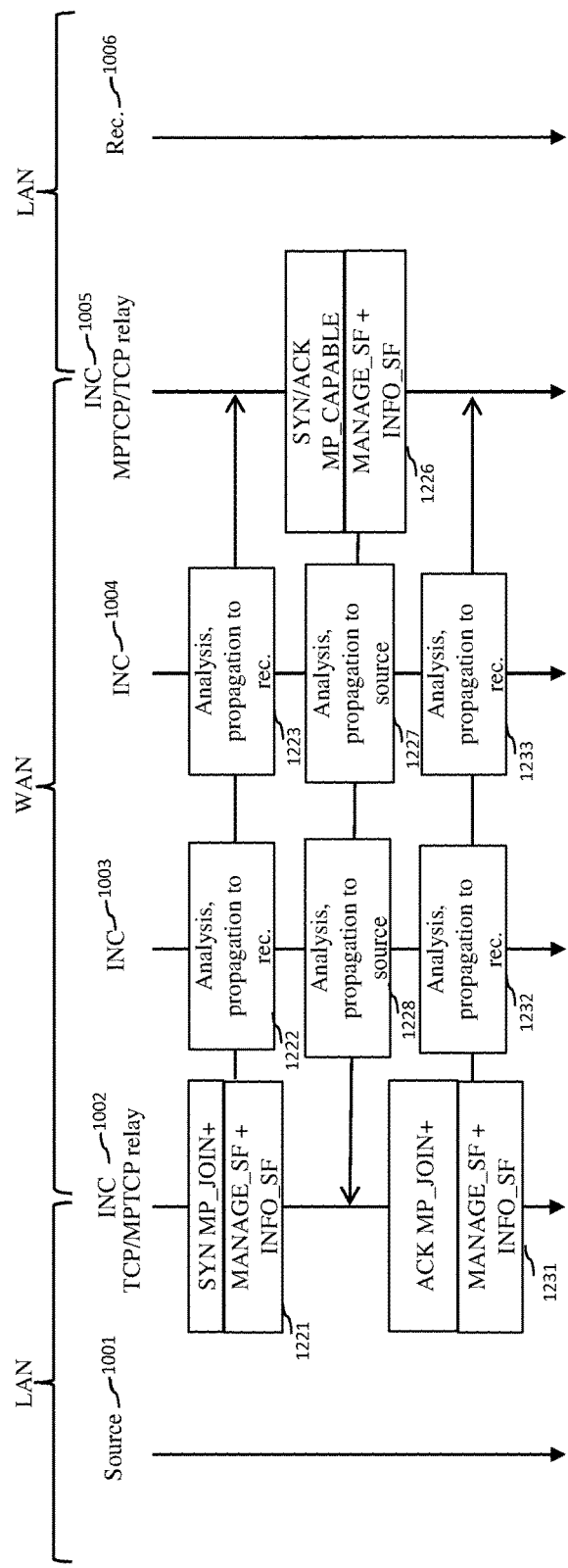
FIG. 12B depicts schematically an example of implementation of a method according to the invention for creating an additional MPTCP subflow in a network in which a TCP source communicates with a TCP receiver by means of an INC implementing the invention, two of the INCs implementing the invention being TCP/MPTCP relays.

FIG. 12B shows schematically an example of implementation of a method according to the invention for creating an additional MPTCP subflow in a network in which a TCP source communicates with a TCP receiver by means of an INC implementing the MPTCP+ method, two of the INCs implementing the MPTCP+ method being TCP/MPTCP relays.

In the example described in relation to FIG. 12, we reuse the network described in relation to FIG. 1. As in the example in FIG. 12A, the source 1001 and the receiver 1006 are incompatible with the MPTCP protocol and the MPTCP+ method and communicate using the TCP protocol. The INCs 1002 and 1005 are TCP/MPTCP relays and are compatible with the MPTCP+ method.

In addition, we assume that the embodiment described in relation to FIG. 12B follows the embodiment described in relation to FIG. 12A, so that the additional MPTCP subflow created in the example in FIG. 12B is an additional MPTCP subflow belonging to the same MPTCP connection as the relayed initial MPTCP subflow the creation of which was described in relation to FIG. 12A. The additional MPTCP flow is a relayed additional MPTCP subflow since, as we describe below, two relay TCP flows are used to relay it.

We also assume that the relay TCP flows used to relay the relayed additional MPTCP subflow are source relay TCP flows and the receiver relay TCP flow created during the implementation described in relation to FIG. 12A. In other words, no relay TCP flow is created specifically for the relayed additional MPTCP subflow. It is therefore the same relay MPTCP subflows that are used to relay the relayed initial TCP subflow and the relayed additional MPTCP subflow.

In a step 1221, the INC 1002 initiates a three-way handshake procedure to create the relayed additional MPTCP subflow. The relayed initial MPTCP subflow uses, for example, the same sextuplet as the one used in the creation of an additional MPTCP subflow described in relation to FIG. 4 by steps 416 to 430. The three-way handshake procedure begins in a step 1221 with the creation and sending of an MPTCP SYN packet with a header MP_JOIN+ and a header INFO_SUBFLOW. The headers MP_CAPABLE and INFO_SUBFLOW are identical respectively to the headers MP_CAPABLE and INFO_SUBFLOW constructed by the source 1001 during step 416.

Moreover, during step 1221, the INC 1002 makes the association between the source relay MPTCP flow and the relayed additional MPTCP subflow being created.

By making this association, the INC 1002 ensures that each TCP packet received by the INC 1002 is switched either to the relayed initial MPTCP subflow or to the relayed additional subflow. The choice of the MPTCP subflow to be used depends for example on information representing a level of use of each MPTCP subflow. Moreover, each MPTCP packet received by the INC 1002 is switched to the source relay TCP flow, whether it comes from the relayed initial MPTCP subflow or from the relayed additional MPTCP subflow.

Once created, the MPTCP SYN packet containing the headers MP_JOIN+ and INFO_SUBFLOW is sent in the direction of the receiver 1006.

In a step 1222 identical to step 418, the INC 1003 receives the MPTCP SYN packet containing the headers MP_JOIN+ and INFO_SUBFLOW and retransmits it in the direction of the receiver 1006. In a step 1223 identical to step 419, the INC 1004 receives the MPTCP SYN packet containing the headers MP_JOIN+ and INFO_SUBFLOW and retransmits it in the direction of the receiver 1006.

In a step 1226, the INC 1004 receives the MPTCP SYN packet containing the headers MP_JOIN+ and INFO_SUBFLOW and makes the association between the receiver relay TCP flow and the relayed additional MPTCP flow. By making this association, the INC 1005 ensures that each TCP packet received by the INC 1005 is switched either to the relayed initial MPTCP subflow or to the relayed additional MPTCP subflow. The choice of the MPTCP subflow to be used is determined by the INC 1005, for example according to a level of use of each MPTCP subflow. In addition, each MTPCP packet received by the INC 1005 is switched to the receiver relay TCP flow.

Moreover, during step 1226, following the reception of the MPTCP SYN packet containing the headers MP_JOIN+ and INFO_SUBFLOW, the INC 1005 constructs an MPTCP SYN/ACK packet containing a header MP_JOIN+ and a header INFO_SUBFLOW. The headers MP_JOIN+ and INFO_SUBFLOW are identical respectively to the headers MP_JOIN+ and INFO_SUBFLOW constructed by the receiver 1006 during step 421.

Once created, the MPTCP SYN/ACK packet containing the headers MP_JOIN+ and INFO_SUBFLOW is sent in the direction of the source 1001.

In a step 1227 identical to step 423, the INC 1004 receives the MPTCP SYN/ACK packet containing the headers MP_JOIN+ and INFO_SUBFLOW and retransmits it in the direction of the source 1001. In a step 1228 identical to step 424, the INC 1003 receives the MPTCP SYN/ACK packet containing the headers MP_JOIN+ and INFO_SUBFLOW and retransmits it in the direction of the source 1001.

In a step 1231, following the reception of the MPTCP SYN/ACK packet containing the headers MP_JOIN+ and INFO_SUBFLOW, the INC 1002 constructs an MPTCP ACK packet containing a header MP_JOIN+ and a header INFO_SUBFLOW identical respectively to the header MP_JOIN+ and to the header INFO_SUBFLOW, both constructed by the source 1001 during step 426.

In a step 1232 identical to step 428, the INC 1003 receives the MPTCP ACK packet containing the headers MP_JOIN+ and INFO_SUBFLOW and retransmits it in the direction of the receiver 1006. In a step 1233 identical step 429, the INC 1004 receives the MPTCP ACK packet containing the headers MP_JOIN+ and INFO_SUBFLOW and retransmits it in the direction of the receiver 1006.

The three-way handshake procedure enabling the relayed additional MPTCP subflow to be created ends at the reception by INC 1005 of the MPTCP ACK packet containing the headers MP_JOIN+ and INFO_SUBFLOW.

The source 1001 and the receiver 1006 can then communicate using the source relay TCP flow between the source 1001 and the INC 1002, the relayed initial MPTCP subflow and the relayed additional MPTCP subflow between the INC 1002 and the INC 1005 and the receiver relay flow between the INC 1005 and the receiver 1006.

Figure 13:
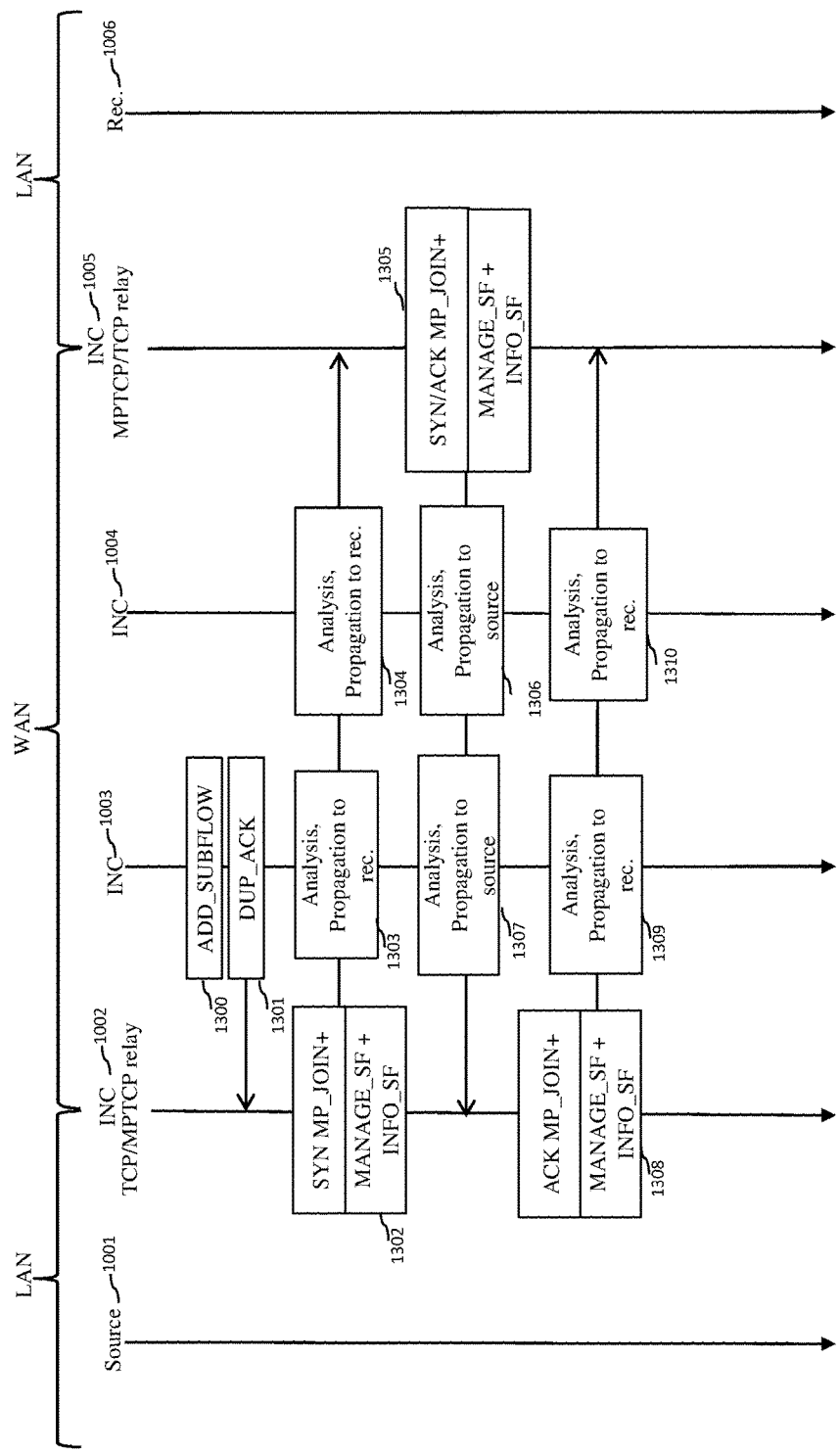
FIG. 13 depicts schematically an example of implementation of a method according to the invention for creating a supplementary MPTCP subflow of an MPTCP connection in a network in which a TCP source communicates with a TCP receiver by means of an INC implementing the invention, two of the INCs implementing the invention being TCP/MPTCP relays.

FIG. 13 depicts schematically an example of implementation of a method according to the invention for creating a supplementary MPTCP subflow in a network in which a TCP source communicates with a TCP receiver by means of an INC implementing the MPTCP+ method, two of the INCs implementing the MPTCP+ method being TCP/MPTCP relays.

In the example described in relation to FIG. 13, we again use the network described in relation to FIG. 1. As in the example of FIG. 12A, the source 1001 and the receiver 1006 are incompatible with the MPTCP protocol and the MPTCP+ method and communicate using the TCP protocol. The INCs 1002 and 1005 are TCP/MPTCP relays and are compatible with the MPTCP+ method.

Moreover, we assume that the embodiment described in relation to FIG. 13 follows the embodiments described in relation to FIGS. 12A and 12B. We assume that the supplementary MPTCP subflow created in the example in FIG. 13 is a supplementary MPTCP subflow of the relayed initial MPTCP subflow the creation of which was described in relation to FIG. 12A. The supplementary MPTCP flow is a relayed supplementary MPTCP flow since, as described hereinafter, two relay TCP flows are used to relay it.

We also assume that the relay TCP flows used to relay the relayed supplementary MPTCP subflow are source relay TCP flows and the receiver relay TCP flows created in the embodiment described in relation to FIG. 12A.

In the example embodiment in FIG. 13, a new intermediate path opens from the INC 1003, in the direction of the INC 1005. One objective of the creation of the relayed supplementary MPTCP subflow is to use this new intermediate path.

The method for creating the relayed supplementary MPTCP subflow is very similar to the method for creating a supplementary MPTCP subflow described in relation to FIG. 5. This is because this method comprises a procedure for signalling and opening a new intermediate path and a three-way handshake procedure between the INC 1002, behaving as a source from the point of view of the MPTCP connection, and the INC 1005, behaving as a receiver from the point of view of the MPTCP connection.

In the example embodiment described in relation to FIG. 13, the relayed supplementary MPTCP subflow shares the source and receiver IP addresses and the source and receiver port numbers of the relayed initial MPTCP subflow created in the embodiment described in relation to FIG. 12A.

In a step 1300, the INC 1003 begins the procedure of signalling the opening of an intermediate path by constructing a header of the ADD_SUBFLOW type.

During a step 1301, the INC 1003 positions the fields SF_Id 1444 and Addr_Id 1445 at values allowing to identify which initial or additional MPTCP subflow must serve as a basis for the creation of the relayed supplementary MPTCP subflow. Since, in the example in FIG. 13, it is the relayed initial MPTCP subflow that is used, the fields SF_Id 1444 and Addr_Id 1445 take values corresponding to the relayed initial MPTCP subflow. The field D 1446 takes the value "0" to indicate that it is for the INC 1002 to initiate the creation of the supplementary MPTCP subflow. The field Seq_Req 1447 takes a random value "AL3" determined by the INC 1003. The random value "AL3" of the field Seq_Req 1447 is stored in the memory of the INC 1003. In this example, the optional field Port 1448 of the header ADD_SUBFLOW is not used since there is no ambiguity about the route to be followed between the INC 1002 and INC 1005.

The procedure for signalling an opening of a new intermediate path continues with a step 1301 during which the header ADD_SUBFLOW is inserted in at least one DUP_ACK packet intended for the source 1001. In one embodiment, the header ADD_SUBFLOW is inserted in a plurality of DUP_ACK packets passing through the INC 1003, using a plurality of existing MPTCP subflows intended for the source 1001.

Following the reception of at least one of the DUP_ACK packets containing the header ADD_SUBFLOW, the INC 1002 associates the relayed supplementary MPTCP subflow with the source relay TCP flow. By making this association, the INC 1002 ensures that each TCP packet received by the INC 1002 is switched to one of the MPTCP subflows (relayed initial, relayed additional or relayed supplementary). The choice of the MPTCP subflow to be used may, there also, depend on information representing a level of use of each MPTCP subflow. In addition, each MPTCP packet received by the INC 1002 is switched to the source relay TCP flow, whether it comes from the relayed initial MPTCP subflow, from the relayed additional MPTCP subflow or from the relayed supplementary MPTCP subflow.

Moreover, during step 1302, the INC 1002 initiates a three-way handshake procedure to create the relayed supplementary MPTCP subflow. The three-way handshake procedure begins with the creation and then the sending, by the INC 1002, during step 1302, of an MPTCP SYN packet comprising a header MP_JOIN+ and a header INFO_SUBFLOW.

The MPTCP SYN packet created during step 1221 is very similar to the MPTCP SYN packet created during step 504. Only the value of the field Seq_Req 1406 of the header INFO_SUBFLOW is different and takes the random value "AL3".

In a step 1303, identical to step 506, the INC 1003 receives the MPTCP SYN packet containing the headers MP_JOIN+ and INFO_SUBFLOW. By reading the value of the field Seq_Req 1406 of the header INFO_SUBFLOW, the INC 1003 determines that this packet relates to the procedure for creating the relayed supplementary MPTCP subflow that it originated, and deduces from this that this packet must be retransmitted to the INC 1005 using the new intermediate path.

During a step 1304 identical to step 507, the INC 1004 receives the MPTCP SYN packet comprising the headers MP_JOIN+ and INFO_SUBFLOW and retransmits it to the INC 1005.

Following the reception of the MPTCP SYN packet comprising the headers MP_JOIN+ and INFO_SUBFLOW, the INC 1005 constructs and sends, during step 1305, an MPTCP SYN/ACK packet with a header MP_JOIN+ and a header INFO_SUBFLOW. The SYN/ACK packet created during step 1305 is identical to the SYN/ACK packet created during step 509.

During steps 1306 and 1307, respectively identical to steps 511 and 512, the INCs 1004 and 1003 receive the MPTCP SYN/ACK packet comprising the headers MP_JOIN+ and INFO_SUBFLOW and retransmit it to the INC 1002.

During a step 1308, the INC 1002 creates an MPTCP ACK packet comprising a header MP_JOIN+ and a header INFO_SUBFLOW. The headers MP_JOIN+ and INFO_SUBFLOW are respectively identical to the headers MP_JOIN+ and INFO_SUBFLOW created by the source 1001 during step 514.

During steps 1309 and 1310, respectively identical to steps 516 and 517, the INCs 1003 and 1004 receive the MPTCP ACK packet comprising a header MP_JOIN+ and a header INFO_SUBFLOW and retransmit it to the INCs 1005 using the new intermediate path. The method for creating the relayed supplementary MPTCP subflow ends when the INC 1005 receives the MPTCP ACK packet comprising a header MP_JOIN+ and a header INFO_SUBFLOW.

The source 1001 and the receiver 1006 can then communicate using the source relay TCP flow between the source 1001 and the INC 1002, the relayed initial MPTCP subflow, the relayed additional MPTCP subflow and the relayed supplementary MPTCP subflow between the INC 1002 and the INC 1005 and the receiver relay flow between the INC 1005 and the receiver 1006.

In the example embodiments described in relation to FIGS. 12A, 12B and 13, each TCP/MPTCP relay may be replaced by a network unit able to effect an encapsulation. In this case, rather than being relayed, each TCP flow is encapsulated in an MPTCP connection composed of a plurality of MPTCP subflows. The use of network units able to effect an encapsulation has no impact on the methods for creating MPTCP subflows.

In a particular embodiment, these TCP/MPTCP relays are replaced by network units able to effect an encapsulation of an MPTCP subflow in a TCP flow.

In this particular embodiment, each encapsulated TCP flow is referred to as a "TCP flow to be encapsulated" and each MPTCP subflow (initial, additional or supplementary) used for encapsulating a TCP flow is referred to as an "encapsulation MPTCP subflow (initial, additional or supplementary)".

The three-way handshake procedures for creating an initial encapsulation MPTCP subflow, and additional encapsulation MPTCP subflow and a supplementary encapsulation MPTCP subflow are respectively identical to the three-way handshake procedures for creating an initial relayed MPTCP subflow, an additional relayed MPTCP subflow and a supplementary relayed MPTCP subflow described in relation to FIGS. 12A, 12B and 13. However, in this case, the initial encapsulation MPTCP subflow and the additional encapsulation MPTCP subflow are established as soon as the encapsulation is created. In the particular embodiment using network units able to effect an encapsulation of a plurality of TCP connections in an MPTCP connection, only the INCs 1002 and 1005 have a different behaviour. This is because, rather than relaying the TCP flows by MPTCP subflows and MPTCP subflows by TCP flows, the INCs 1002 and 1005 encapsulate TCP flows in MPTCP subflows and decapsulate these TCP flows of the MPTCP flows.

The source 1001 and the receiver 1006 can next communicate in the direction going from the source 1001 to the receiver 1006, transparently using encapsulation of the MPTCP type configured between the INC 1002 and the INC 1005.

The invention claimed is:

1. A method for creating a supplementary data packet subflow as a supplement to a data packet subflow existing in a network connection, referred to as a multipath network connection, using a transport protocol suited to a multipath communication mode, the multipath network connection being implemented in a communication network comprising a plurality of network units, a first network unit in said plurality using a connection set comprising said multipath network connection for communicating with a second network unit in said plurality via a third network unit in said plurality, referred to as an intermediate network component, characterised in that, following an opening of an intermediate communication path from the intermediate network component and in the direction of the second network unit, said intermediate network component implements the following steps:
   obtaining a packet intended for the first or second network unit and compatible with said transport protocol;
   creating a header of a first type, the header of the first type representing a request to create said supplementary data packet subflow, the supplementary data packet subflow being intended to use the intermediate communication path in a data packet transfer phase following the creation of the supplementary data packet subflow;
   inserting said header of the first type in said packet;
   transmitting said packet in the direction of said destination so as to cause the initiation, by the first or second network unit, of a procedure for creating said supplementary data packet subflow in the context of said multipath network connection.

2. The method according to claim 1, wherein, for each subflow created in the context of said multipath network connection, the intermediate network component applies an accelerated-processing procedure to each packet transmitted during data packet transfer phases using at least one of said subflows created, and in that the intermediate network component interrupts the accelerated-processing procedure for at least one of the subflows created in order to allow to obtain said packet in which the header of the first type is to be inserted and to transmit said packet in which the header of the first type has been inserted.

3. The method according to claim 1, wherein the procedure for creating the supplementary data packet subflow comprises a three-way handshake procedure implemented between two network units in said plurality comprising:
   a first step of creating and transmitting a first synchronisation packet in the direction of the second network unit via the intermediate network component;
   a second step of creating and transmitting a second synchronisation packet in the direction of the first network unit and via the intermediate network component, the second synchronisation packet being able to acknowledge receipt of the first synchronisation packet;
   a third step of creating and transmitting a receipt-acknowledgement packet in the direction of the second network unit via the intermediate network;
   at least one packet exchanged during the three-way handshake procedure comprises a header of a second type comprising information causing the use of said intermediate communication path during the data packet transfer phase.

4. The method according to claim 3, wherein the header of the second type of the first synchronisation packet is created and inserted by the first network unit in said first synchronisation packet.

5. The method according to claim 4, wherein, when the header of the first type is created, the intermediate network component determines a random sequence number and inserts said random sequence number in the header of the first type, said random sequence number being used by the intermediate network component to identify packets exchanged between the source and the receiver via the intermediate network component in the context of the three-way handshake procedure.

6. The method according to claim 5, Wherein, when the first synchronisation package is created, the random sequence number value determined by the intermediate network component is copied into a first field of the header of the second type, so that, when the intermediate network component subsequently receives a first synchronisation packet comprising a first field the value of which is equal to the value of said random sequence number, the intermediate network component determines that said first synchronisation packet relates to the procedure for creating the supplementary data packet subflow and deduces from this that the first synchronisation packet must be transmitted using the intermediate communication path.

7. The method according to claim 6, wherein, when the first synchronisation packet is created, a subflow identifier defined by the first network unit is attributed to the supplementary subflow and is inserted in a second field of the header of the second type, and in that, on reception, by the intermediate network component, of the first synchronisation packet comprising the first field the value of which is equal to the value of said random sequence number, the intermediate network component associates the subflow identifier, defined by the first network unit, inserted in the second field of the header of the second type, with the intermediate path so that each packet transmitted by the first network unit during the data packet transfer phase uses the intermediate communication path.

8. The method according to claim 7, wherein, when the first synchronisation packet is created, the intermediate subflow is associated with an address of the first network, the address having been used by the existing data packet subflow, and an identifier of the address of the first network unit is inserted in a third field of the header of the second type, and in that, when the first synchronisation packet is received by the intermediate network component, the intermediate network component associates the identifier of the address of the first network unit with the subflow identifier.

9. The method according to claim 5, wherein, to close the supplementary subflow, the intermediate network component performs the following steps:
   obtaining a data packet the destination of which is the first or second network unit and compatible with the transmission protocol;
   creating a header of a fourth type, the header of the fourth type representing a request to close the supplementary data subflow,
   inserting said header of the fourth type in said packet;
   transmitting said packet in the direction of the destination so as to cause the initiation, by the first or second network unit, of a procedure to close the supplementary data subflow.

10. The method according to claim 9, wherein, when the header of the fourth type is created, a plurality of items of information are inserted in the header of the fourth type, the plurality of items of information comprising an identifier of an address associated with the supplementary data packet subflow, an identifier of the subflow associated with the supplementary data subflow, and a value indicating which network unit must initiate the procedure for closing the supplementary data packet subflow, this plurality of items of information being used so as to close the supplementary subflow at the first and second network units.

11. The method according to claim 9, wherein, when the header of the first type is created, the intermediate network component determines a first port number in a first set of port numbers associated with a communication path belonging to a transmission path used to transmit said packet in which the header of the first type is inserted and inserts information representing the first port number in the header of the first type, the information representing said first port number being used by the intermediate network component to packets exchanged between the source and the receiver via the intermediate network component in the context of the three-way handshake procedure, and when the header of the fourth type is created, a plurality of items of information are inserted in the header of the fourth type, the plurality of items of information comprising an identifier of an address associated with the supplementary data packet subflow, information representing the first port number and a value indicating which network unit must initiate the procedure for closing the supplementary data packet subflow, this plurality of items of information being used so as to close the supplementary subflow at the first and second network units.

12. The method according to claim 3, wherein the header of the second type of the first synchronisation packet is created and inserted by the intermediate network component in said first synchronisation packet.

13. The method according to claim 12, wherein the header of the second type of the second synchronisation packet is deleted from said second synchronisation packet by the intermediate network component before being transmitted to the first network unit.

14. The method according to claim 13, wherein the header of the second type of the receipt-acknowledgement packet is created and inserted in the receipt-acknowledgement packet by the intermediate network component.

15. The method according to claim 12, when the header of the first type is created, the intermediate network component determines a first port number in a first set of port numbers associated with a communication path belonging to a transmission path used to transmit said packet in which the header of the first type is inserted and inserts information representing the first port number in the header of the first type, the information representing said first port number being used by the intermediate network component to identify packets exchanged between the source and the receiver via the intermediate network component in the context of the three-way handshake procedure.

16. The method according to claim 15, wherein said destination is the first network unit or the second network unit and in that, when the destination is the second network unit, the second network unit implements the following steps:

creating a header of a third type, the header of the third type comprising information representing the first port number;

obtaining a packet intended for the first network unit;

inserting said header of the first type in said packet obtained; and transmitting said packet in the direction of the first network unit so that the first network unit communicates with the intermediate network component using a destination port corresponding to the first port number.

17. The method according to claim 16, wherein the first synchronisation packet is sent to a port of the intermediate network component corresponding to the first port number, reception of the first synchronisation packet on said port of the intermediate network component corresponding to the first port number enabling the intermediate network component to determine that said first synchronisation packet relates to the procedure for creating the supplementary data packet subflow and deduces from this that the first synchronisation packet must be transmitted using the intermediate communication path.

18. The method according to claim 17, wherein, when the header of the second type inserted in the first synchronisation packet is created, the intermediate network component inserts in said header of the second type information representing a first set of local port numbers dependent on the first port number, each network unit in said plurality, through which the first synchronisation packet passes, defines a second set of local port numbers included in the set of port numbers represented by the information representing a set of local port numbers received in said header of the second type, and replaces said information representing a set of local port numbers contained in said header of the second type with information representing the second set of local port numbers.

19. The method according to claim 16, wherein the receipt-acknowledgement packet is sent to a port of the intermediate network component corresponding to the first port number, receipt of the receipt-acknowledgement packet on said port of the intermediate network component corresponding to the first port number enabling the intermediate component to determine that said receipt-acknowledgement packet relates to the procedure for creating the supplementary data packet subflow and deduces from this that the receipt-acknowledgement packet must be transmitted using the intermediate communication path.

20. The method according to claim 1, wherein the set of connections comprises a single-path connection, and in that the intermediate network component relays a subflow of a multipath connection in a flow of a single-path connection or encapsulates a subflow of a multipath connection in a flow of a single-path connection, the first and third steps of the three-way handshake procedure and/or the second step of the three-way handshake procedure being implemented by an intermediate network component.

21. A non transitory readable medium containing computer instructions that, when executed by a device, performs the method according to claim 1 by a processor of the device.

22. Storage means storing a computer program containing instructions for the implementation, by a device, of the method according to claim 1 when said program is executed by a processor of the device.

23. A device of the intermediate network component type able to create a supplementary data packet subflow as a supplement to a data packet subflow existing in a network connection, referred to as a multipath network connection, using a transport protocol suited to a multipath communication mode, the multipath network connection being used in a communication network comprising a plurality of network units, a first network unit in said plurality using a set of connections comprising said multipath network connection to communicate with a second network unit in said plurality via said device, wherein following the opening of an intermediate communication path from said device and in the direction of the second network unit, said device is-comprises electronic circuitry that:

obtains a packet destined for the first or second network unit and compatible with said transport protocol;

creates a header of a first type, the header of the first type representing a request to create said supplementary data packet subflow, the supplementary data packet subflow being intended to use the intermediate communication path in a data packet transfer phase following the creation of the supplementary data packet subflow;

inserts said header of the first type in said packet;

transmits said packet in the direction of the destination of the packet so as to cause the initiation, via the first or second network unit, of a procedure of creating said supplementary data packet subflow in the context of said multipath network connection.

24. A communication system comprising at least one device of the intermediate network component type according to claim 23 and a plurality of network units comprising first and second network units able to communicate using a set of connections comprising a connection, referred to as a multipath network connection, using a transport protocol suited to a multipath communication mode, following the opening of an intermediate communication path from said device of the intermediate network component type and in the direction of the second network unit, the first network unit comprises electronic circuitry that:

creates and transmits a first synchronisation packet in the direction of the second network unit via said device of the intermediate network component type;

creates and transmits a receipt-acknowledgement packet in the direction of the second network unit via said device of the intermediate network component type in response to a second synchronisation packet coming from the second network unit;

the second network unit comprising the following means, used following the opening of said intermediate communication path:

creating and transmitting a second synchronisation packet in the direction of the first network unit and via said device of the intermediate network component type, the second synchronisation packet being able to acknowledge receipt of the first synchronisation packet;

at least one packet comprising a header of a second type comprising information causing the use of said intermediate communication path during a data packet transfer phase in the context of the supplementary data packet subflow.

* * * * *